(12) United States Patent
Luick et al.

(10) Patent No.: US 12,365,133 B2
(45) Date of Patent: Jul. 22, 2025

(54) SYSTEMS AND METHODS FOR CONTROLLING ADDITIVE MANUFACTURING PROCESSES

(71) Applicant: Blue Origin Manufacturing, LLC, Huntsville, AL (US)

(72) Inventors: Landon Luick, Kent, WA (US); Steven James Craigen, Auburn, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/513,351

(22) Filed: Nov. 17, 2023

(65) Prior Publication Data

US 2024/0083105 A1 Mar. 14, 2024

Related U.S. Application Data

(62) Division of application No. 16/120,050, filed on Aug. 31, 2018, now Pat. No. 11,890,807.

(60) Provisional application No. 62/553,075, filed on Aug. 31, 2017.

(51) Int. Cl.
| | | |
|---|---|---|
| *B29C 64/371* | (2017.01) | |
| *B29C 64/135* | (2017.01) | |
| *B29C 64/214* | (2017.01) | |
| *B29C 64/393* | (2017.01) | |
| *B29C 64/40* | (2017.01) | |
| *B33Y 10/00* | (2015.01) | |
| *B33Y 30/00* | (2015.01) | |
| *B33Y 40/00* | (2020.01) | |
| *B33Y 50/02* | (2015.01) | |

(52) U.S. Cl.
CPC .......... *B29C 64/135* (2017.08); *B29C 64/214* (2017.08); *B29C 64/371* (2017.08); *B29C 64/393* (2017.08); *B29C 64/40* (2017.08); *B33Y 10/00* (2014.12); *B33Y 30/00* (2014.12); *B33Y 40/00* (2014.12); *B33Y 50/02* (2014.12)

(58) Field of Classification Search
CPC ..... B29C 64/214; B29C 64/983; B29C 64/40; B29C 64/371; B33Y 30/00; B33Y 40/00
See application file for complete search history.

(56) References Cited

U.S. PATENT DOCUMENTS

| | | |
|---|---|---|
| 3,169,183 A | 2/1965 | Radtke |
| 3,560,258 A | 2/1971 | Brisbane |
| 3,702,389 A | 11/1972 | Peyrot |
| 4,504,726 A | 3/1985 | Hosaka |
| 4,532,401 A | 7/1985 | Shiozaki |
| 4,584,479 A | 4/1986 | Lamattina et al. |
| 4,609,566 A | 9/1986 | Hongo |
| 4,818,562 A | 4/1989 | Arcella et al. |

(Continued)

OTHER PUBLICATIONS

U.S. Appl. No. 16/120,050, filed Aug. 31, 2018, Luick.

(Continued)

*Primary Examiner* — Christina A Johnson
*Assistant Examiner* — Xue H Liu
(74) *Attorney, Agent, or Firm* — Hogan Lovells US LLP

(57) ABSTRACT

Systems and methods for controlling additive manufacturing processes are disclosed. The systems can include multiple laser directors, soot-removal devices, magnetic chucks, replenishable powder distribution blades, automated powder level detectors, and/or overall process automation techniques.

11 Claims, 24 Drawing Sheets

(56) References Cited

U.S. PATENT DOCUMENTS

| | | | |
|---|---|---|---|
| 4,851,061 A | 7/1989 | Sorkoram | |
| 4,964,940 A | 10/1990 | Auvert et al. | |
| 5,159,169 A | 10/1992 | Nishikawa | |
| 5,227,608 A | 7/1993 | Yoshida | |
| 5,407,119 A | 4/1995 | Churchill | |
| 5,837,960 A | 11/1998 | Lewis et al. | |
| 5,906,760 A | 5/1999 | Robb et al. | |
| 5,930,606 A | 7/1999 | McCulloch | |
| 5,977,515 A | 11/1999 | Uraki | |
| 6,429,402 B1 | 8/2002 | Dixon | |
| 6,657,154 B1 | 12/2003 | Tanabe | |
| 7,073,561 B1 | 7/2006 | Henn | |
| 7,168,935 B1 | 1/2007 | Taminger | |
| 7,357,629 B2 * | 4/2008 | Weiskopf | B33Y 30/00 425/188 |
| 7,902,483 B2 | 3/2011 | Eiterer et al. | |
| 8,172,562 B2 | 5/2012 | Mattes | |
| 8,452,073 B2 | 5/2013 | Taminger | |
| 8,546,717 B2 | 10/2013 | Stecker | |
| 8,847,104 B2 | 9/2014 | Wang et al. | |
| 9,138,807 B1 | 9/2015 | Takezawa et al. | |
| 9,221,100 B2 | 12/2015 | Schwarze et al. | |
| 9,254,535 B2 | 2/2016 | Buller et al. | |
| 9,346,127 B2 | 5/2016 | Buller et al. | |
| 9,358,638 B2 | 6/2016 | Hori et al. | |
| 9,399,256 B2 | 7/2016 | Buller et al. | |
| 9,403,235 B2 | 8/2016 | Buller et al. | |
| 9,486,878 B2 | 11/2016 | Buller et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,784,111 B2 | 10/2017 | Luo et al. | |
| 9,821,411 B2 | 11/2017 | Buller et al. | |
| 9,844,915 B2 | 12/2017 | Maeda et al. | |
| 9,919,360 B2 | 3/2018 | Buller et al. | |
| 9,925,715 B2 | 3/2018 | Cheverton et al. | |
| 9,931,697 B2 | 4/2018 | Levin et al. | |
| 9,956,612 B1 | 5/2018 | Redding et al. | |
| 9,962,767 B2 | 5/2018 | Buller et al. | |
| 9,993,873 B2 | 6/2018 | Kovalcik et al. | |
| 2002/0108934 A1 | 8/2002 | Garcia | |
| 2002/0153360 A1 | 10/2002 | Yamazaki | |
| 2002/0182877 A1 | 12/2002 | Nantel | |
| 2003/0106881 A1 | 6/2003 | Lee | |
| 2008/0067160 A1 | 3/2008 | Suutarinen | |
| 2008/0241425 A1 | 10/2008 | Li | |
| 2010/0108648 A1 | 5/2010 | Koseki | |
| 2011/0008530 A1 | 1/2011 | Woods | |
| 2012/0094839 A1 | 4/2012 | Khare et al. | |
| 2013/0341313 A1 | 12/2013 | Himmelsbach | |
| 2014/0124483 A1 | 5/2014 | Henn et al. | |
| 2014/0263246 A1 | 9/2014 | Brice | |
| 2014/0271328 A1 | 9/2014 | Burris | |
| 2015/0037601 A1 | 2/2015 | Blackmore | |
| 2015/0136226 A1 | 5/2015 | Guo et al. | |
| 2015/0258633 A1 | 9/2015 | Hori | |
| 2015/0328719 A1 | 11/2015 | Jarvis | |
| 2016/0059310 A1 | 3/2016 | Junker | |
| 2016/0107232 A1 | 4/2016 | Okazaki et al. | |
| 2016/0114427 A1 | 4/2016 | Eibl et al. | |
| 2016/0207147 A1 | 7/2016 | Van Hassel | |
| 2017/0050261 A1 | 2/2017 | Li | |
| 2017/0146382 A1 | 5/2017 | Gold et al. | |
| 2017/0151727 A1 | 6/2017 | Ederer et al. | |
| 2017/0173883 A1 | 6/2017 | Gray | |
| 2017/0190112 A1 | 7/2017 | Thorson et al. | |
| 2017/0209961 A1 | 7/2017 | Cavanaugh | |
| 2017/0304947 A1 | 10/2017 | Shubazaki | |
| 2017/0334099 A1 | 11/2017 | Araie et al. | |
| 2018/0200964 A1 | 7/2018 | Rockstroh | |
| 2018/0236549 A1 | 8/2018 | Spears et al. | |
| 2019/0030650 A1 | 1/2019 | Clark | |
| 2020/0266105 A1 | 8/2020 | Ikenoue | |
| 2021/0078104 A1 | 3/2021 | Maattanen | |
| 2021/0287921 A1 | 9/2021 | Tanaka | |

OTHER PUBLICATIONS

U.S. Appl. No. 16/830,141, filed Mar. 25, 2020, Keleshian et al.
Benda, J.A., "Temperature-Controlled Selective Laser Sintering," United Technologies, Research Center, East Hartford, CT., 1994, 8 pages.
Renisi—"Unlock your additive manufacturing possibilities with multi-laser productivity," https://www.renishaw.com/en/unlock-your-additive-manufacturing-possibilities-with-multi-laser-productivity--43419, Jun. 1, 2018, 4 pages.

* cited by examiner

SYSTEMS AND METHODS FOR CONTROLLING ADDITIVE MANUFACTURING PROCESSES

CROSS-REFERENCE TO RELATED APPLICATION

The present application is a divisional of U.S. patent application Ser. No. 16/120,050, filed on Aug. 31, 2018, which claims priority to U.S. Provisional application 62/553,075, filed on Aug. 31, 2017, and incorporated herein by reference.

TECHNICAL FIELD

The present technology is directed generally to systems and methods for controlling additive manufacturing processes, including powder bed-based processes.

BACKGROUND

Additive manufacturing, also commonly referred to as 3D printing, includes depositing layers of material to create a three-dimensional object. These techniques have found a wide variety of applications and can be used to produce objects of nearly any shape, based on data from a three-dimensional, computer-generated model.

In a typical powder bed additive manufacturing process, a thin layer of powder is spread onto a substrate. A laser or electron beam follows a computer-generated path over the powder to melt and solidify the powder only in areas corresponding to the desired part on any given layer. Then an additional layer of powder is laid upon the first layer, and the laser again solidifies the desired portions of powder. This process is repeated until the complete object is manufactured. After the object is manufactured, the excess powder is removed, and the finished product is separated from the support substrate.

While the foregoing process has proven successful in many contexts, drawbacks still remain. For example, it can be difficult to precisely control the temperature and solidification rate of the powder meltpool for manufacturing consistency. The process of overheating the powder produces soot (vaporized material that condenses as fine particulates) which interferes with the laser beam and/or contaminates the manufactured object. Vaporizing material also results in process instabilities due to the unpredictable nature of material transitioning from solid to gaseous state and reversing to solid state within very short time frames. In some cases, the recoating process of laying down new powder layers creates wear on the recoater arm blade leaving striations in subsequent powder layers and in the printed object. Still further, the recoating process can fail or delay a print if too little powder is dispensed and spread over a new layer. Some embodiments of the presently disclosed technology address one or more of the foregoing drawbacks, in addition to providing further benefits described below.

DETAILED DESCRIPTION

Figure 1:
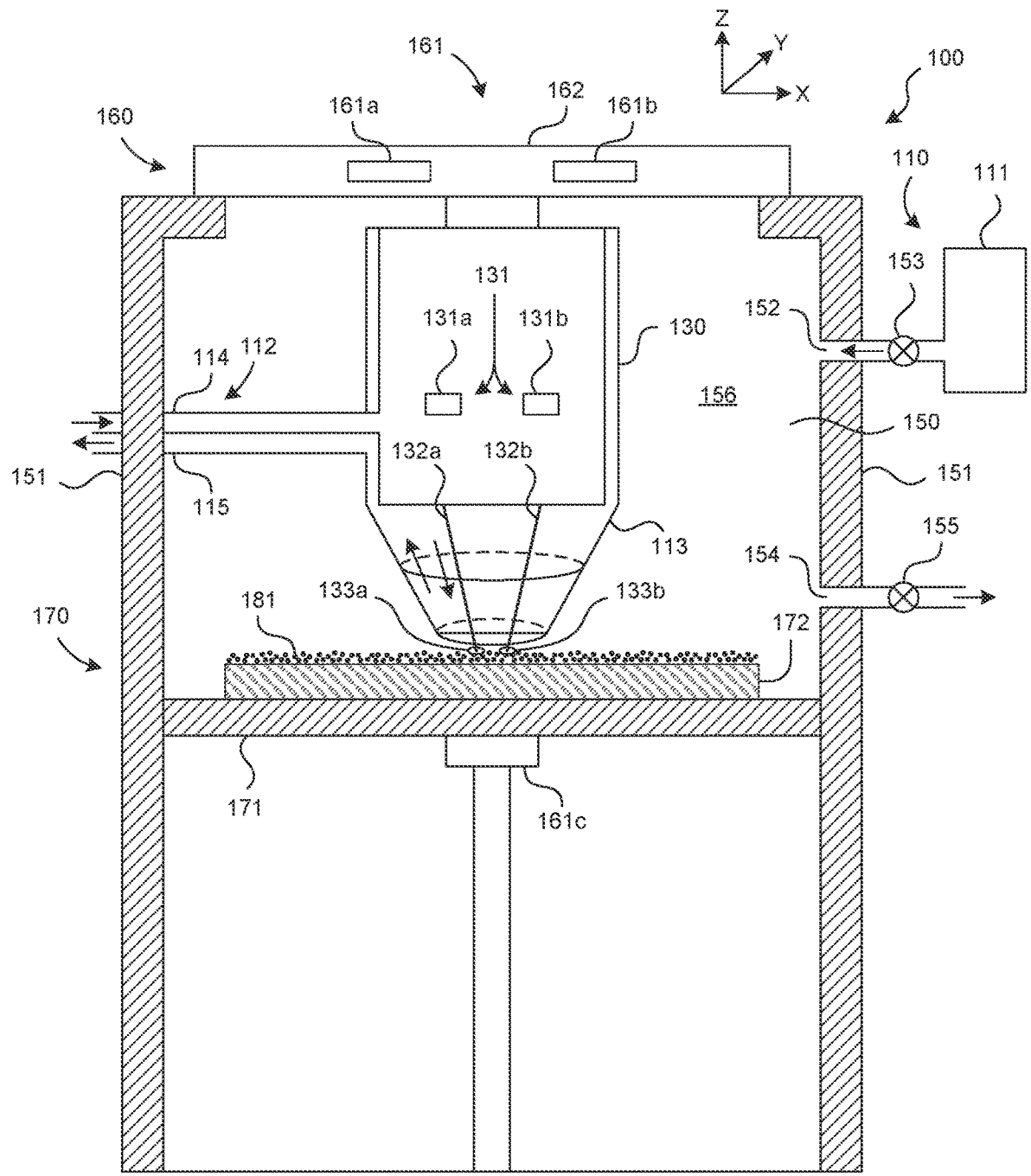
FIG. 1 is a partially schematic, partially cross-sectional illustration of an overall system configured in accordance with some embodiments of the present technology.

Several embodiments of the present technology are directed to systems and methods for controlling additive manufacturing processes. In some embodiments, the systems can include multiple lasers that can more accurately control the heating and/or cooling process of the additive material as it is solidified to form a desired three-dimensional object. In some embodiments, the soot produced by the process of melting and/or solidifying the additive material can be controlled and removed so as to reduce or eliminate the likelihood for the soot to interfere with the laser, electron beam or other energy used to solidify the additive material. In some embodiments, the process of supporting and removing the substrate or platform (e.g., build plate) that is used to build the part can be simplified via a magnetic, rather than mechanical, attach-and-release arrangement. In some embodiments, the process of adding new layers of additive material to already-formed layers of additive material can be made more efficient by continuously supplying a replenishable blade material that accurately spreads a controlled-thickness layer of additive material on the existing bed of material. In some embodiments, the overall process of forming the part, removing excess powder from the part, and then removing the part from its support platform can be automated or partially automated. This process can be facilitated by using a movable container that contains the part from start to finish as it moves from one automated station to another.

Several embodiments of the technology described below may take the form of computer- or controller-executable instructions, including routines executed by a programmable computer or controller. Those skilled in the relevant art will appreciate that the technology can be practiced on computer/ controller systems other than those shown and described below. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, which includes cloud computing, program modules or sub- routines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of embodiments of the technology.

Each of the features outlined above are described below under corresponding headings for sake of clarity and organization. Any of the features described herein may be combined in suitable manners with any of the other features described herein without deviating from the scope of the present technology, independent of the headings.

1.0 Overview

FIG. 1 is a partially schematic, partially cut-away illustration of a system 100 configured to manufacture parts using additive manufacturing processes in accordance with some embodiments of the present technology. The system 100 can include an environmentally controlled chamber 150 in which a support structure 170 is positioned. The support structure 170 includes a build platform (e.g., a plate) 172 that carries additive material, generally in the form of multiple, sequentially deposited additive material layers 181, each of which is initially in a powder form (e.g., a powder bed). A head 130 is positioned over the build platform 172, and locally heats selected portions of each sequentially deposited additive material layer 181 to melt and consolidate the powder, forming a stack of hardened material layers that together form a finished part. A motion device 160 provides for relative movement between the head 130 and the additive material layer 181.

More specifically, in some embodiments, the support structure 170 includes a support element 171 that in turn removably carries the build platform 172. The region between the build platform 172 and the head 130 is sometimes referred to herein as a build region. The head 130 can be carried by a gantry 162, and the motion device 160 can include multiple actuators 161 that provide for the relative motion between the head 130 and the support structure 170. For example, the actuators 161 can include first and second actuators 161a, 161b (shown schematically) that move the laser head 130 in corresponding X and Y directions. In a particular example, the first actuator 161a moves the head 130 relative to the gantry 162 along the x-axis, and the second actuator 161b moves the gantry 162 relative to the chamber 150 along the y-axis. A third actuator 161c (also shown schematically) can move the support element 171 in the Z direction. For example, as material is added to the build platform 172 during the construction of the desired part, the third actuator 161c can lower the support element 171. After each subsequent layer of additive material 181 is deposited on the layer below, the first and second actuators 161a, 161b move the head 130 in a pattern that produces the portion of desired part corresponding to that layer.

The head 130 can be used to supply and/or direct energy toward the build platform 172 and the additive material 181. The energy can include any of a variety of suitable electromagnetic energy types, e.g., light and/or particles (e.g., electrons). In particular embodiments, the energy includes laser energy in the form of a laser beam, and accordingly, several embodiments are described below in the context of a laser beam. In other embodiments, other suitable beams are used. In general, the beams are focused or concentrated, e.g., using optical elements for a light beam, or electromagnetic elements (to locally alter the electromagnetic field) for an electron beam or other particle beam.

To direct the energy to the additive material 181, the head (and/or other system element) can carry multiple directors 131 (e.g. laser directors). For example, the head 130 can carry a first director 131a and a second director 131b. Each of the directors 131a, 131b generates and/or directs a corresponding energy beam (e.g., a laser beam) 132a, 132b which in turn produces a corresponding spot (e.g., a laser spot) 133a, 133b at the additive material layer 181. As will be described in further detail later, each of the directors 131 can produce a spot having a different size, power, and/or other process parameter so as to better control the process of forming solidified material from the initially powdered additive material layer 181.

The chamber 150 can include chamber walls 151 that define an interior chamber volume 156. In order to better control the manufacturing process, the environment within the chamber volume 156 can be controlled. For example, the system 100 can include a chamber gas system 110. The chamber gas system 110 can control the atmosphere in the chamber volume 156 to be inert, so as to reduce or eliminate the likelihood for the additive material 181 and/or the manufactured part to become contaminated with potentially reactive materials (e.g., oxygen and/or water). Accordingly, the chamber gas system 110 can include an inert gas supply 111 that provides an inert gas (e.g., argon) to the chamber 150 via a chamber inlet 152 and an associated inlet valve 153. The inert gas displaces air and other contaminants (e.g., water vapor) via a chamber outlet 154 and associated outlet valve 155. By using the inert gas supply 111, the operator can purge the chamber volume 156 of air and/or other contaminating gases before the additive manufacturing process is initiated.

The chamber gas system 110 can further include a recirculating gas system 112 that operates during the manufacturing process, e.g., after the additive manufacturing process has been initiated. The recirculating gas system 112 can include a recirculating gas inlet 114 that directs the inert gas to a nozzle 113, and a recirculating gas outlet 115 that removes the inert gas, along with soot and/or other contaminants, thereby reducing the likelihood for such contaminants to interfere with the energy beam and/or be formed or otherwise introduced into the manufactured object and/or the associated powder.

In particular embodiments, the build platform 172 has an effective building area of greater than 20 inches by 20 inches, e.g., 36 inches by 36 inches, 48 inches by 48 inches, or 72 inches by 72 inches. The chamber 150 can have a cross-sectional area generally parallel to the support element 171 and the build platform 172 that is greater than 20 inches by 20 inches to accommodate the build platform 172 and the structures built upon it. The build platform 172 can have other (e.g., larger) dimensions in other embodiments.

Further details of each of the foregoing systems and subsystems are described below.

2.0 Multiple Lasers

Figure 2A:
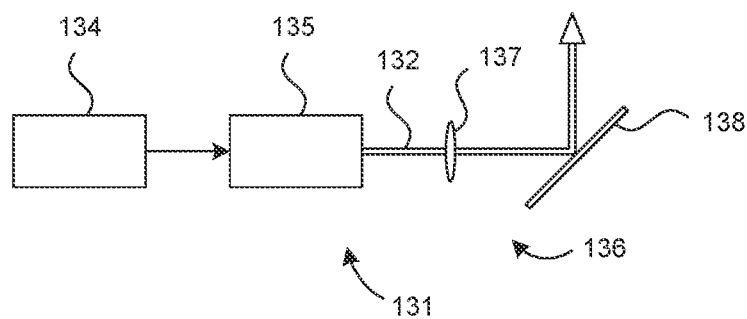
FIG. 2A is a schematic illustration of a laser director configured in accordance with some embodiments of the present technology.

FIG. 2A is a schematic illustration of a representative director 131 configured in accordance with some embodiments of the present technology. The director 131 can include a power supply 134 which provides power to a beam generator 135, which in turn produces and emits an energy beam 132. The director 131 can further include optics (or other direction-controlling elements, e.g., magnets) 136 that control the shape and/or direction of the beam 132. Accordingly, the optics 136 can include one or more lenses 137 and/or one or more mirrors 138.

Figure 2B:
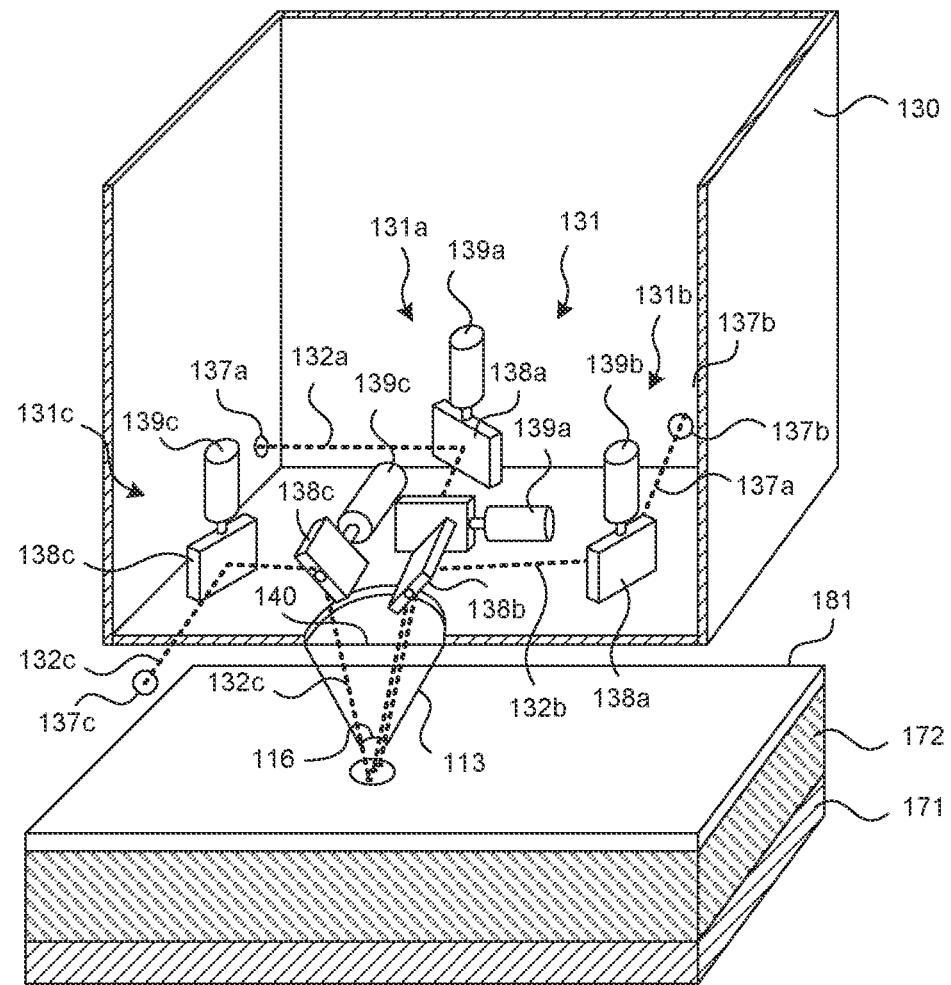
FIG. 2B is a partially schematic, partially cross-sectional illustration of a laser head configured in accordance with some embodiments of the present technology.

FIG. 2B schematically illustrates three directors 131, shown as a first director 131a, a second director 131b, and a third director 131c, each carried by the head 130. Each director 131a, 131b, 131c can include some or all of the elements described above with reference to FIG. 2A, including corresponding lenses 137a, 137b, 137c, and corresponding mirrors 138a, 138b, 138c. Each director 131a, 131b, 131c produces a corresponding energy beam 132a, 132b, 132c. The mirrors and/or the lenses can be controlled by corresponding actuators 139 (e.g., galvanometers or "galvos"), illustrated as first actuators 139a, a second actuator 139b, and third actuators 139c. Each of the resulting beams 132a, 132b, 132c passes through a window 140 of the head 130 and through the gas nozzle 113 toward the build platform 172 and associated support element 171. Accordingly, each of the energy beams 132a, 132b, 132c impinges on the additive material layer 181 in a region circumscribed by a downward projection of the inner edge 116 of the nozzle 113.

Figure 3:
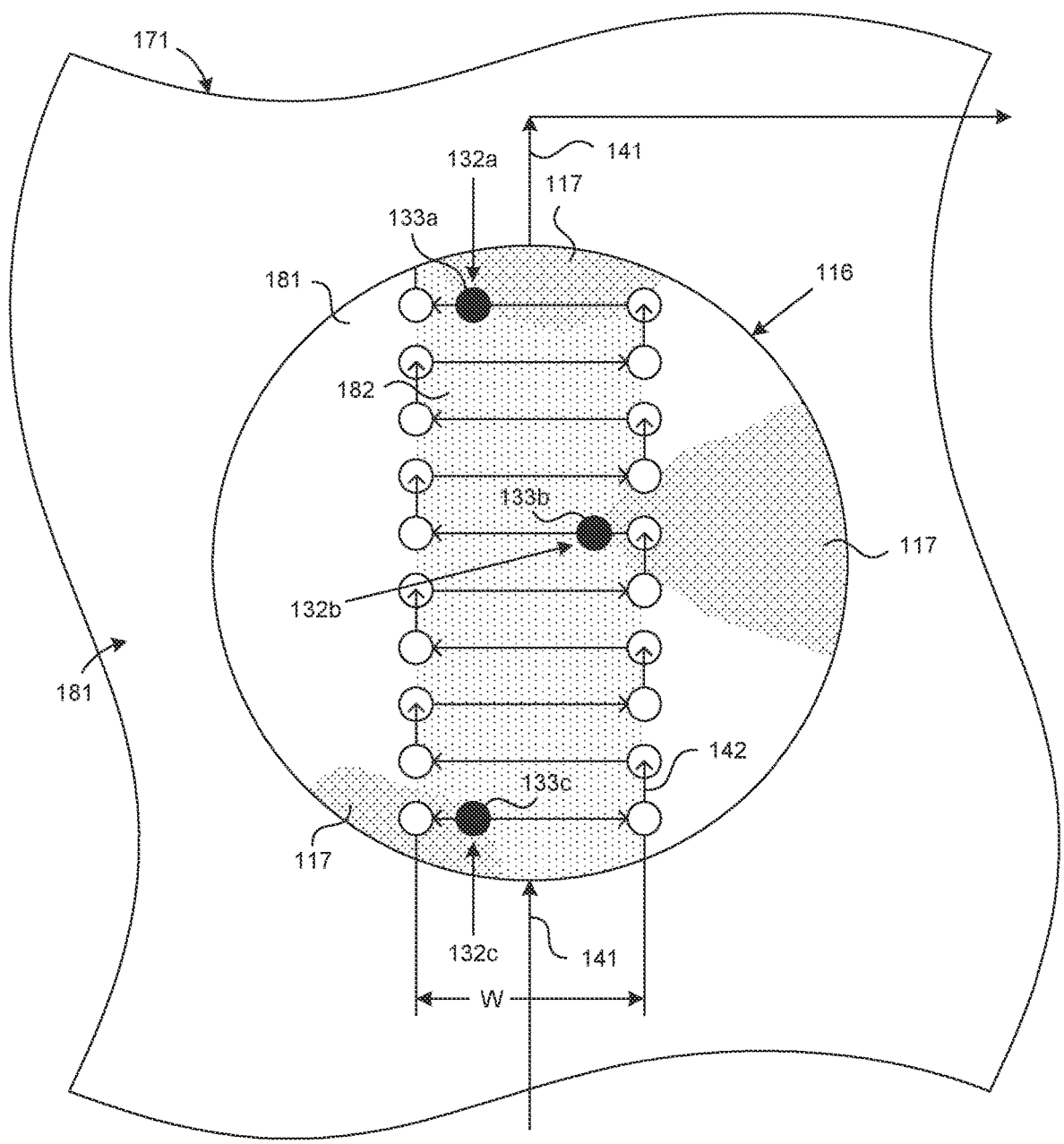
FIG. 3 is a partially schematic illustration of a representative laser head path and laser beam paths in accordance with some embodiments of the present technology.

FIG. 3 is a partially schematic plan view of the support element 171 and associated additive material layer 181. FIG. 3 also shows the projection of the nozzle inner edge 116 within which the three energy beams 132a, 132b, 132c pass. Each of the energy beams produces a corresponding spot, shown as a first spot 133a, a second spot 133b, and a third spot 133c. The head 130 (FIG. 2B) passes over the additive material layer 181 along a computer-defined head path 141. Each of the energy beams 132a, 132b, 132c oscillates back and forth as the head 130 moves along the head path 141, as indicated by a beam path 142. As the three energy beams 132a, 132b, 132c pass over the additive material layer 181 along the beam path 142, they produce a solidified material 182 having a width W.

In some embodiments, each of the first, second, and third energy beams 132a, 132b, 132c carries out a different function and/or can be controlled independently of the others. For example, the first energy beam 132a can preheat the additive material (e.g., to a temperature less than the melting point, or by an amount that does not completely melt the local additive material), the second energy beam 132b can melt (or fully melt) the additive material (e.g., to produce a meltpool at the additive material layer 181), and the third energy beam 132c can control the rate at which the meltpool cools (e.g., by adding heat to reduce the cooling rate), in order to form a solidified part. Accordingly, the first energy beam 132a can have a first energy density or other energy-based parameter selected to produce a first temperature at the additive material layer 181 suitable for preheating. The second energy beam 132b can have a second energy density, higher than the first energy density and suitable for melting the additive material. The third beam 132c can have a third energy density, less than the second energy density, and greater (or less) than the first energy density to control (e.g., reduce) the rate at which the melted additive material cools. As used herein, the term "energy density" refers generally to the power of the energy beam per unit volume. More specifically, the energy density can refer to the power of the energy beam divided by the product of the spot size area and the additive material layer thickness. Controlling the energy density can in turn: (a) reduce or eliminate material vaporization to reduce or eliminate soot formation and/or the violence and/or process unpredictability that may be associated with metal vaporization, and/or (b) reduce or eliminate residual stresses that may result from an uncontrolled cooling process.

In a representative preheat process, the intended average temperature of the additive material does not exceed the melting temperature of the additive material. Local melting (sintering) of the powder is intended such that the powder becomes more consolidated so that when the second energy beam 132b impinges on the additive material layer 181, it doesn't vaporize isolated powder particles.

The pre-heating processes can slow down the heating rate to avoid spiking temperatures and/or to prevent or reduce material from being vaporized before the desired melting temperature is reached. The post-melting process can slow down the meltpool cooling rate such that residual stresses are reduced or eliminated.

By controlling heating rates, peak temperature, and/or cooling rates, the process can more reliably produce the desired material properties, surface finish, and/or feature definition.

The energy density of each of the energy beams 132a, 132b, 132c can be controlled via one or more of several methods. For example, the voltage used to generate the energy beam can be used to control the power of the beam, and the optics used to shape the energy beam can control the cross-sectional area of the beam, and therefore the power density of the beam. Accordingly, the lenses can be used to create a larger spot, with a reduced power density, or a smaller spot with an increased power density. These parameters, alone or in combination with other parameters (e.g., the relative scan rate between the energy beam and the additive material 181), can be used to control the temperature of the additive material at the beam spot where the beam impinges on the additive material.

One aspect of some embodiments described in the context of FIGS. 2B and 3 is that the head (e.g., a single head) can emit three energy beams, one for preheating, one for melting, and one for controlling the rate at which the melted material cools (e.g., post-melting or post-heating). An advantage of this arrangement, in addition to providing improved control over the meltpool properties, is that co-locating the multiple directors in a single head reduces overall system complexity. In some embodiments, one or more of the foregoing energy beams can be eliminated. For example, the preheating beam can be eliminated, and the post-heating beam retained, or the post-heating beam can be eliminated, and the preheating beam retained. The head 130 can also provide additional beams. For example, the head 130 can include a fourth director (not visible in FIG. 3) that emits a corresponding fourth energy beam and provides redundancy for the system, and/or additional functionality for the system. Accordingly, in some embodiments, the fourth energy beam can be controlled to have an energy level, intensity, and/or density corresponding to any of the foregoing three energy beams so as to substitute for any of the foregoing three directors in the event that one director ceases to operate as expected. A representative embodiment of a device that directs four energy beams is described further below with reference to FIG. 4B.

Referring again to FIG. 3, each of the spots 133a, 133b, 133c can produce soot 117. Aspects of the present technology are directed to removing the soot from the localized region in which it is formed, so as to reduce or eliminate the tendency for the soot to interfere with the energy beam and/or contaminate the manufactured part. Further details are described below.

3.0 Soot Removal

Figure 4A:
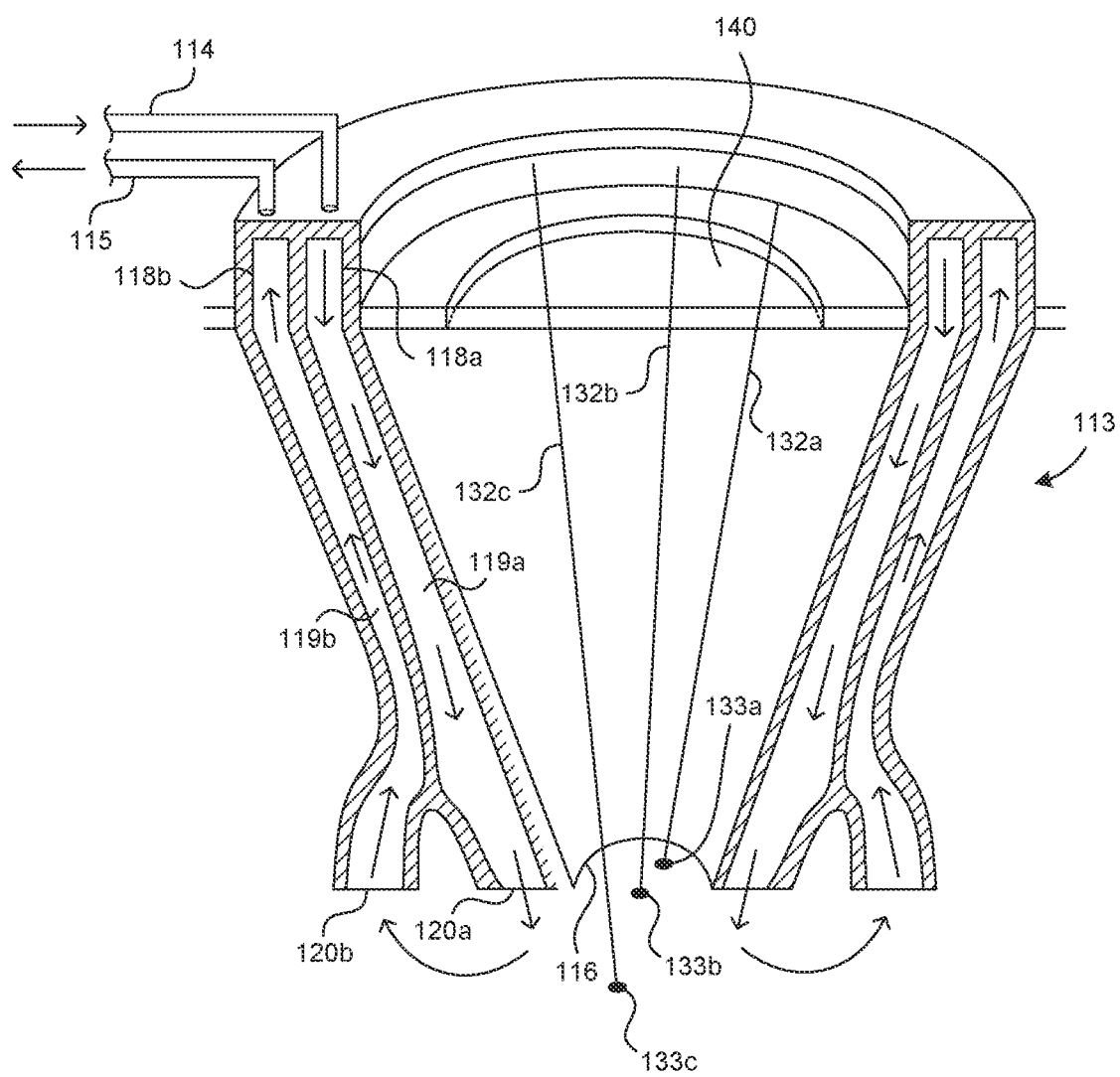
FIG. 4A is a partially schematic, partially cross-sectional illustration of a representative nozzle used to supply and return gas during an additive manufacturing process in accordance with some embodiments of the present technology.

FIG. 4A is partially schematic, cross-sectional illustration of the nozzle 113 described above and configured in accordance with some embodiments of the present technology. The nozzle 113 can receive a gas (e.g., a purge gas) via the recirculation inlet 114, and return the purge gas via the recirculation outlet 115. In some embodiments, the nozzle 113 can include a supply plenum 118a that receives the incoming purge gas, and a gas supply passage 119a that delivers the purge gas to a corresponding nozzle exit 120a. The purge gas entrains soot and/or other particulates and/or contaminants in the region of the beam spots 133a, 133b, 133c and is returned via a return passage entrance 120b, a gas return passage 119b, and a return plenum 118b. The pressure and/or flow rate of the purge gas can be set and/or controlled to reduce or eliminate disturbances to the powder bed. In this manner, the recirculated purge gas can reduce or eliminate the likelihood of energy beam interference and/or contamination by soot and/or other substances.

Figure 5:
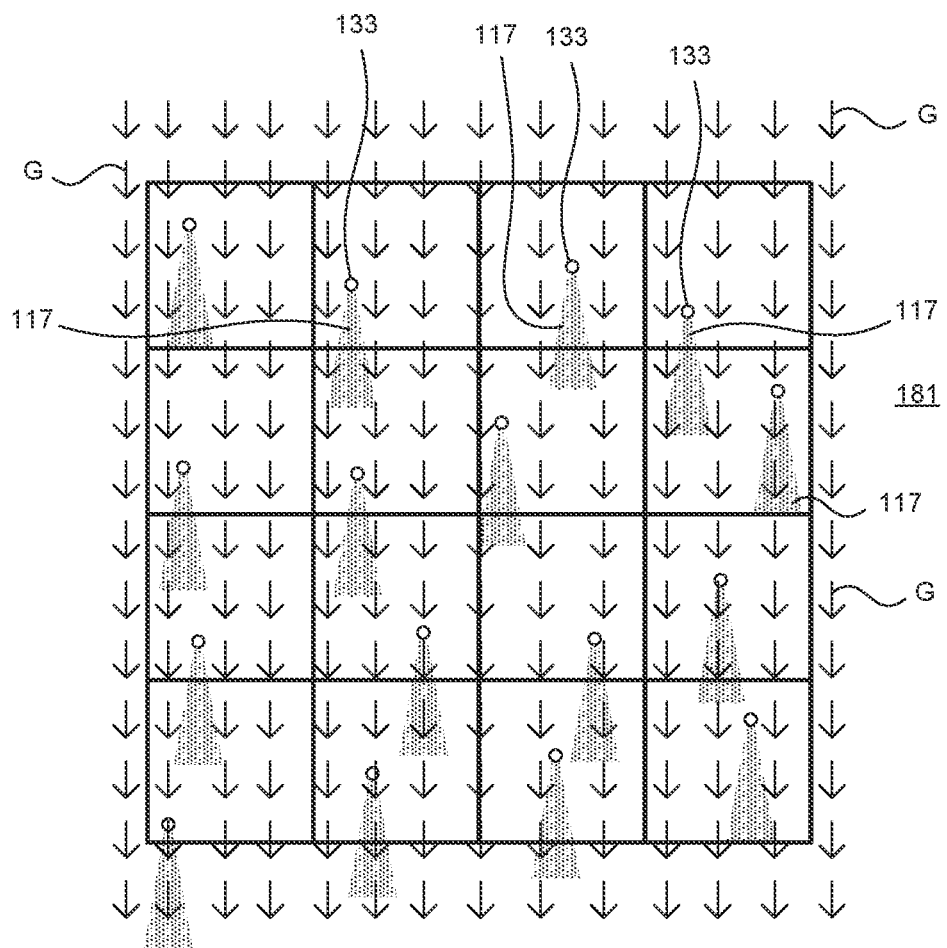
FIG. 5 is a schematic illustration of an additive manufacturing process that produces and removes soot in accordance with the prior art.

The approach shown in FIG. 4A is unlike a representative conventional approach, which is illustrated in FIG. 5. As shown in FIG. 5, conventional additive manufacturing systems (e.g., powder bed systems) produce a single beam spot 133 that traverses the corresponding additive material layer 181, and is shown in multiple sequential locations in FIG. 5 for purposes of illustration. At each location, the beam spot 133 produces a soot plume 117. In conventional systems, a platform-wide flow of argon, indicated by arrows G, passes transversely over the entire additive material layer 181 to remove the soot. However, because the soot passes over multiple regions of the additive material layer 181 as it is evacuated, including regions that have and have not yet been processed, the soot 117 can contaminate both pre-processed and post-processed portions of the additive material layer 181, reducing the quality of the manufactured part. Some embodiments of the present technology can reduce or eliminate this drawback by withdrawing soot and/or other contaminants in the immediate vicinity where they were produced, as described above.

Figure 4B:
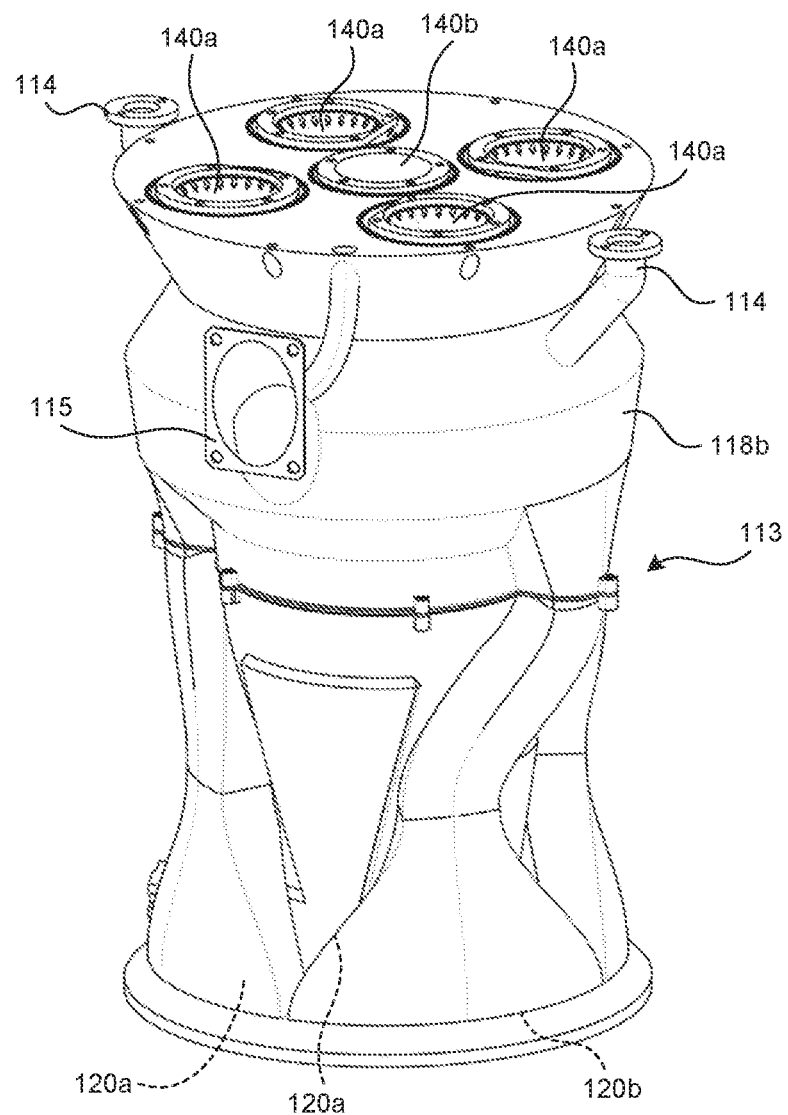
FIG. 4B is a partially schematic, isometric illustration of a representative nozzle configured in accordance with embodiments of the present technology.

FIG. 4B illustrates a representative nozzle 113 that is configured to transmit up to four energy beams, while providing gas recirculation, generally as described above with reference to FIG. 4A. In other embodiments, the nozzle can transmit more or fewer than four energy beams. In the illustrated example, the nozzle 113 can include four energy beam windows 140a, each positioned to pass a corresponding energy beam downwardly toward a powder bed (not shown in FIG. 4B). The nozzle 113 can also include a sensor window 140b positioned to allow a camera or other sensor to access the powder bed below, for example, to monitor the melting and solidification process. The nozzle 113 can include one or more gas inlets 114 (two are shown in FIG. 4B) which direct gas to corresponding nozzle exits 120a positioned around the circumference of the nozzle 113. Corresponding return passage entrances 120b, positioned annularly outwardly from the nozzle exits 120a, receive the gas, along with soot and/or other contaminants, and return the gas to the return plenum 118b. The gas is then removed from the nozzle 113 via an outlet 115.

Figure 4C:
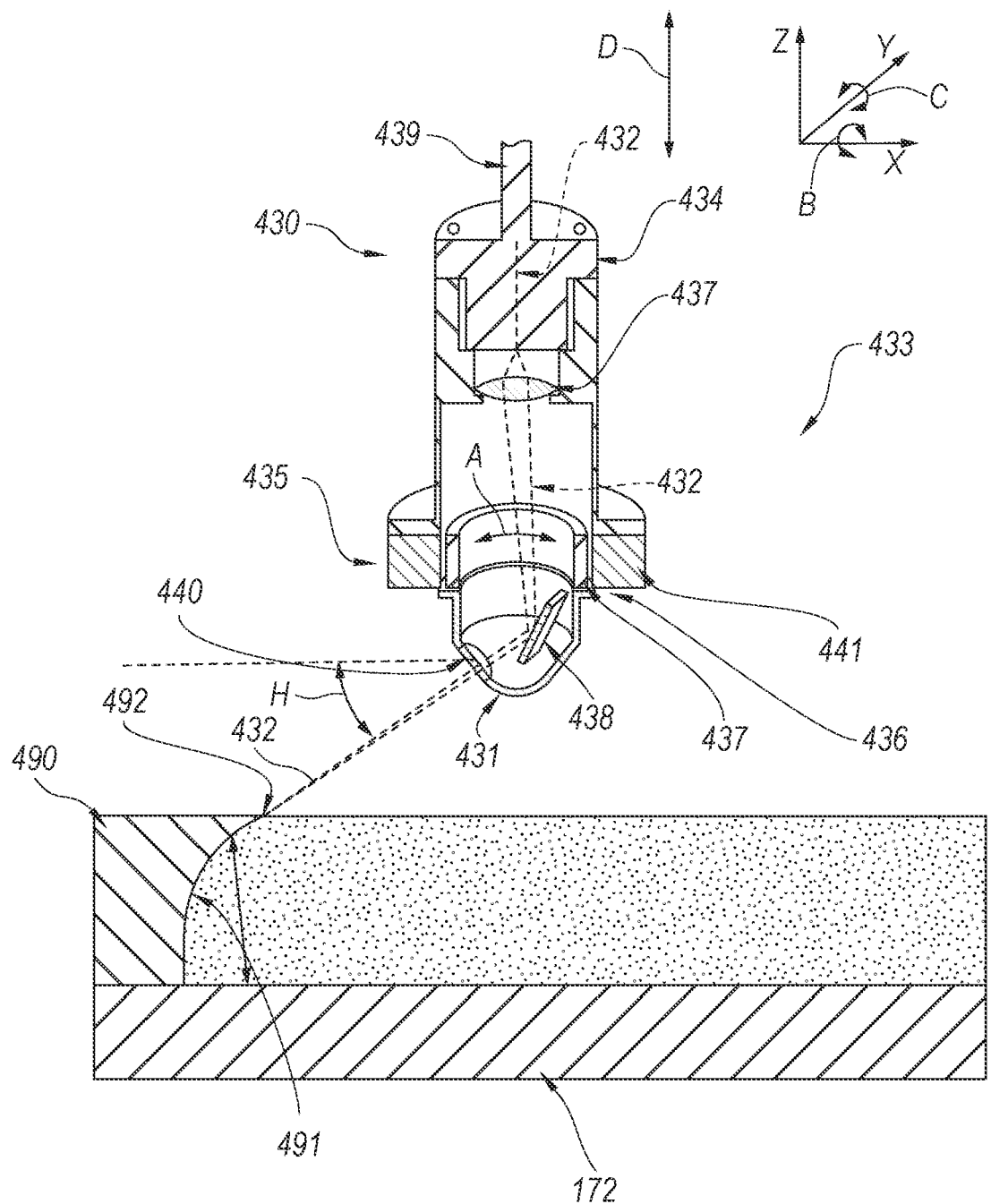
FIG. 4C is a partially schematic, cross-sectional illustration of a laser head used to direct a laser beam at selected angles, in accordance with some embodiments of the present technology.

In some embodiments, the overall system 100 can include special-purpose laser heads, in addition to the (primary) laser heads described above. For example, FIG. 4C is a partially schematic illustration of a laser head 430 that is particularly configured to form overhanging structures, in accordance with embodiments of the present technology. The laser head 430 can be included in the same overall device 100 shown in FIG. 1, but can be used on an as-needed basis. Accordingly, the laser head 430 can be coupled to the primary laser head, and move with the primary laser head via the gantry described above with reference to FIG. 1. In another embodiment, the laser head 430 can be carried by a separate gantry. In still another embodiment, the primary laser head can be fixed, and the special purpose laser head 430 can be carried by a gantry. The laser head 430 can receive laser energy via a laser fiber 439 that is connected via a fiber receiver 434. A laser beam 432 is introduced into the laser head 430 via the laser fiber 439 and passes through a focusing lens 437 to a mirror 438. The mirror 438 is positioned in a turret 431 that includes a window 440 for directing the reflected laser beam 432 to an object 490 that is being formed. In particular, the laser beam 432 can be directed at an angle of up to 70° below horizontal to create a local meltpool 492 at an overhanging portion 491 of the object 490. meltpool In other embodiments, the angle can be up to 50°, and in still further embodiments, the angle can be above horizontal. Accordingly, the angle can range over +/−70° from horizontal, or +/−50° from horizontal, depending on the application.

The laser head 430 can be arranged to change the orientation of the laser beam 432 in any one or more of several manners. For example, the turret 431 can be rotatable relative to the rest of the laser head 430 and can be coupled to an actuator 435 to rotate about the z-axis (e.g., the laser beam axis), as indicated by arrow A. In a particular embodiment, the actuator 435 includes a motor 441 having a fixed stator 436 and a rotatable rotor 437 carried by the turret 431. The mirror 438 can be fixed in some embodiments, or the mirror can be adjustable. The laser head 430 can translate laterally in the x-y plane, either via a dedicated gantry, or via the gantry that carries the primary laser head, as discussed above. The laser head 430 can, in some embodiments, rotate about the x-axis, as indicated by arrow B, and/or the y-axis, as indicated by arrow C. In some embodiments, the laser head 430 can move vertically, as indicated by arrow D, for example, to keep the laser focused on a target position, even if the laser beam 432 has a fixed focal point, and the laser head rotates about the x-axis and/or the y-axis In a particular embodiment, the laser head 430 directs a single laser beam. In other embodiments, the laser head 430 can be configured to direct multiple laser beams, as discussed above with reference to FIGS. 1-4B. The laser head 430 can also include a gas recirculation arrangement, generally similar to those described above with reference to FIGS. 4A and 4B. An advantage of embodiments of the system that include a laser head of the type described above with reference to FIG. 4C is that the laser head can specifically target manufacture of overhanging structures. Accordingly, the laser head can be deployed specifically for structures that require its directional flexibility, without overly interfering with the rest of the manufacturing process, typically carried out by a primary laser head of the type discussed above with reference to FIGS. 1-4B.

Figure 6:
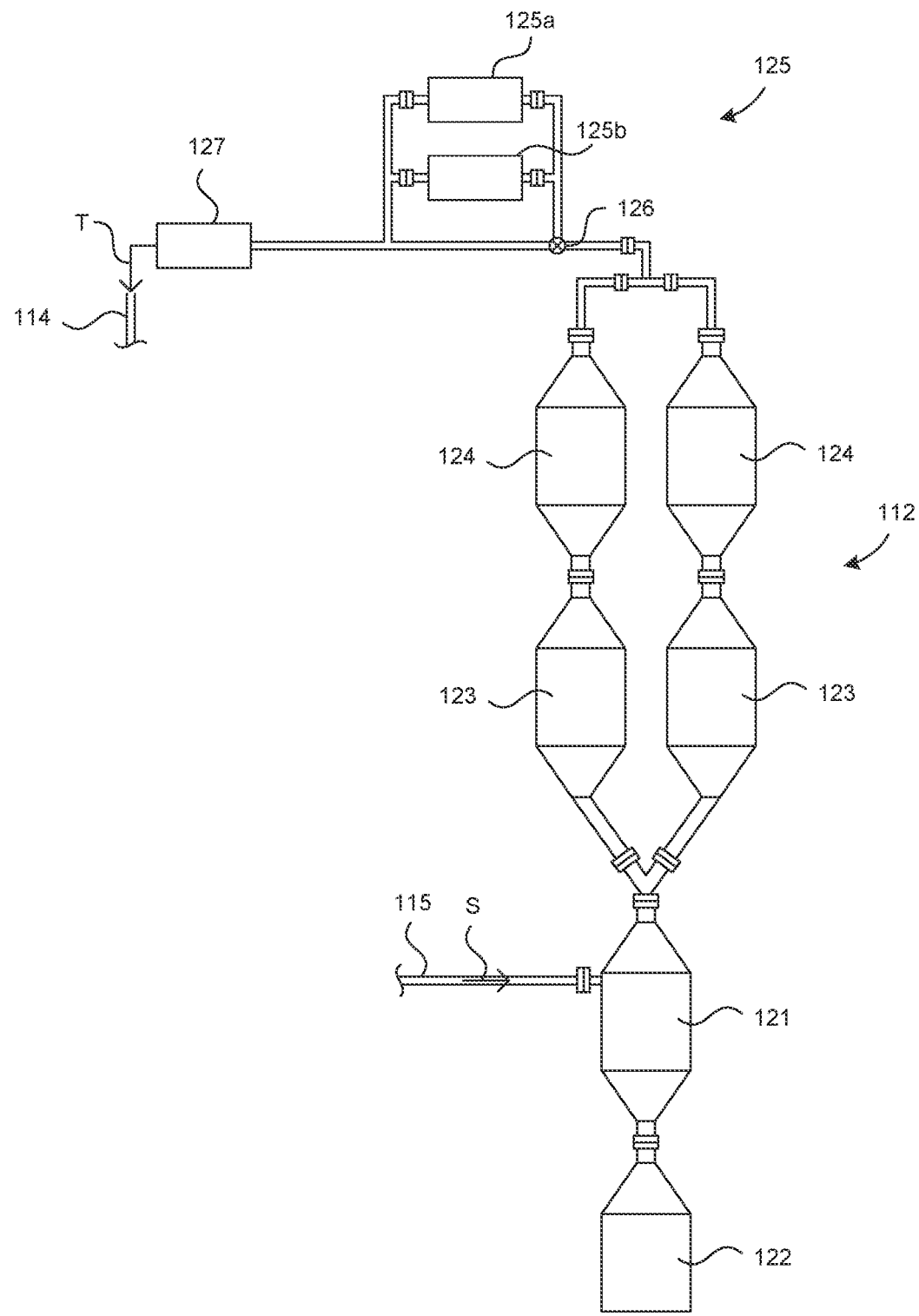
FIG. 6 is a partially schematic illustration of a gas recirculation system configured in accordance with some embodiments of the present technology.

Returning briefly to FIGS. 4A and 4B, once the recirculating gas has been removed via the nozzle 113, it can be treated (e.g., purified) and returned to the nozzle 113 for continued use. FIG. 6 is a partially schematic illustration of representative components for performing this function. In FIG. 6, arrow S indicates the contaminated purge gas removed from the nozzle 113 (FIG. 4), which is directed to a separator 121. The separator 121 can remove particulates and direct them to a collection bin 122. The particulates can include not only soot, but also powdered additive material, which can be further separated (e.g., from the soot) and reused in a subsequent manufacturing process. The gas removed at the separator 121 can be directed to one or more pre-filters 123 and then to one or more finer filters (e.g., HEPA filters) 124. The recirculating gas system 112 can further include a catalytic purifier 125 to further process the gas before it is returned to the processing chamber 150 (FIG. 1), and/or the nozzle 113 (FIG. 4). For example, the catalytic purifier 125 can include an oxygen scrubber 125a and/or a water scrubber 125b that remove oxygen and water, respectively, from the processed gas. Because the processing chamber 150 is generally sealed and because the gas is recirculated, it is not expected that all the removed gas will need to pass through the catalytic purifier 125 on a continuous basis. Instead, a valve 126 can be used to direct a fraction of the removed gas to the catalytic purifier 125, and the process of recirculating the gas can result in suitably purified gas that is returned to the recirculation inlet 114 by a pump 127, as indicated by arrow T. Using this process, the oxygen and/or water levels can be reduced to a value between 1 ppm and 50 ppm. For example, an advantage of some embodiments that include a recirculation system 112 is that the system can reduce argon consumption, and retrieve powdered additive material that may be entrained along with the soot and/or other contaminants. Another advantage of embodiments of the purification system is that they can facilitate operating at lower oxygen and water concentrations than can be practically achieved by displacing the local atmosphere with inert gas. Accordingly, additive material is less likely to pick up hydrogen and oxygen, which can adversely affect the desirable properties of the additive material and can adversely affect the ability to reuse the additive material. Catalyst beds can also significantly speed up machine purge down times allowing for shorter build turnaround times.

4. Magnetic Support Systems

Figure 7:
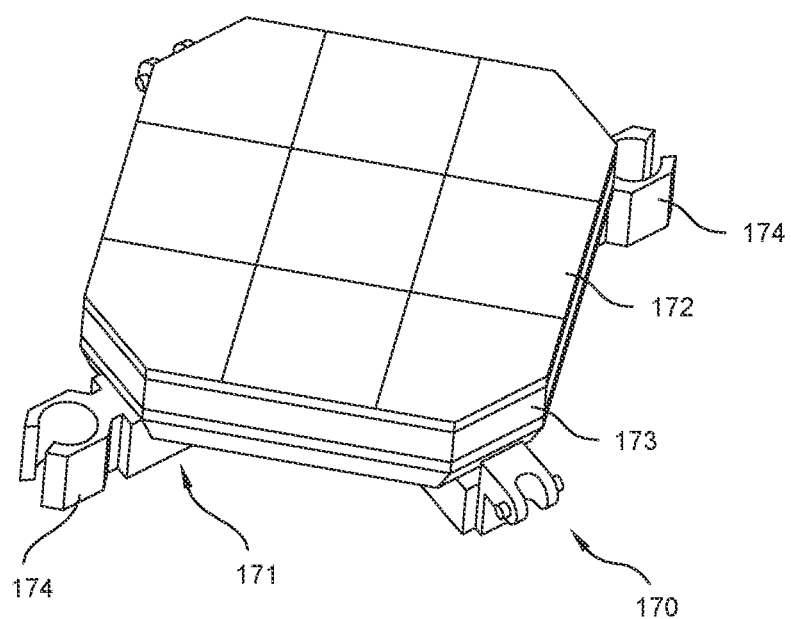
FIG. 7 is a partially schematic illustration of a support structure configured in accordance with some embodiments of the present technology.

FIG. 7 is a partially schematic, isometric illustration of a representative support structure 170 that includes a support element 171 and a magnetic chuck 173. The magnetic chuck 173 releasably supports the build platform 172. The magnetic chuck 173 can include one or more electromagnets that are activated to secure the build platform 172, and deactivated to release the build platform 172. The support element 171 can also include one or more actuator interfaces 174 that allow the support structure 170 to be raised and lowered, as will be described in further detail later.

An advantage of some embodiments of the present technology that include a magnetic chuck 173 is that the chuck can facilitate a more rapid and/or smoother process for attaching and releasing the build plates 172. For example, adding plates and removing plates with parts on them is significantly easier with a magnetic chuck than with fasteners. This can be particularly useful for automated processes (described in further detail later), which may otherwise include unscrewing a fastener with an unknown preload and an unknown printed part interfering with the unscrewing mechanism during plate removal.

On large scale powder bed printers, the magnetic chuck can facilitate using multiple smaller build plates instead of one large build plate. One challenge associated with conventional multiple smaller build plate arrangements is that they each need to be fastened down at their corners, leaving many "no go" zones (e.g., no build zones) in order to allow the fasteners to be removed once the build is done. Magnetic chucks can eliminate the need for such fasteners.

One advantage of multiple smaller build plates is that a 1 inch thick build plate that is 48 inches by 48 inches, weighs 675 pounds, which is too much for one person to load and unload by hand. However, sixteen 12 inch by 12 inch build plates would only weigh 42 pounds each, which is a reasonable weight for one person to load and unload.

Another advantage of multiple smaller build plates is that they can break up residual stresses that typically form in the build plates. The greatest displacement due to distortion in build plates is at the edges. One large build plate will distort more at its edges than the sum of the distortions associated with nine smaller build plates.

In a particular embodiment, the magnet used to attach the build plates is electro-permanent. This magnet is deactivated by sending a series of electrical pulses that move the magnetic field from between the chuck and the build plates to inside the magnetic chuck itself. This means that no active electrical current is necessary to keep the magnet on or off. The electrical current is only needed to switch the magnet between off and on.

5. Recoater System

Figure 8A:
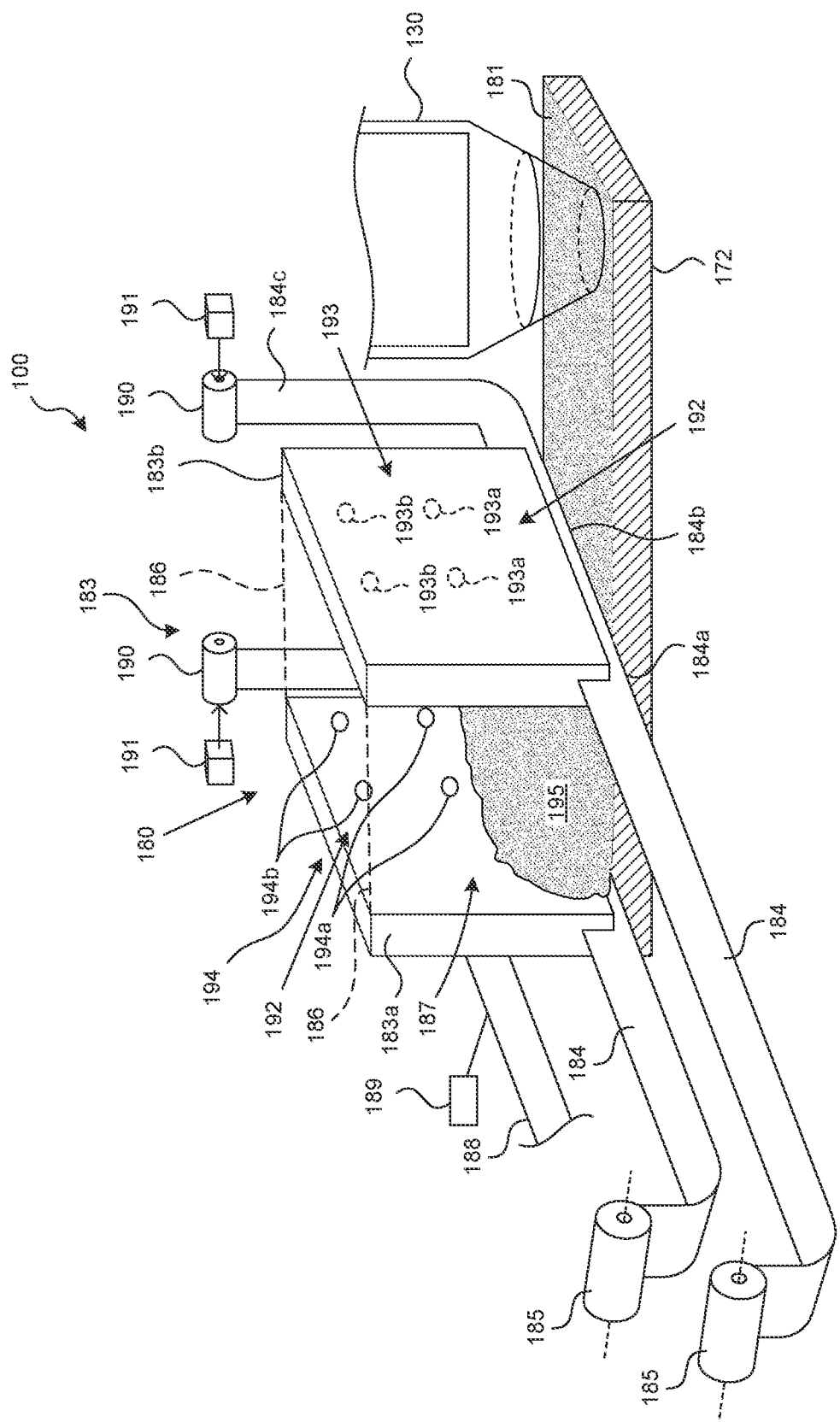
FIG. 8A is a partially schematic illustration of an additive material control system configured to operate in accordance with some embodiments of the present technology.

FIG. 8A is a partially schematic, isometric illustration of a portion of the overall system 100, illustrating further details of an additive material control system (e.g., a recoater) 180 that can be included in the overall system 100. The additive material control system 180 can include one or more arms (e.g., recoater arms) 183. A single, bi-directional recoater arm 183 is shown in FIG. 8A, and includes a first transverse arm portion 183a, and a second transverse arm portion 183b. The control system 180 can further include end walls 186 (shown schematically in dashed lines) that, together with the transverse arm portions 183a, 183b, define a powder application chamber 187. The powder application chamber 187 can be attached to a carriage 188 which is driven by a corresponding actuator 189 (shown schematically) to move across the build platform 172. In this manner, the additive material control system 180 deposits a new layer of additive material 181 once the previous layer has been processed.

To control the depth of the additive material layer 181 applied to the material below, each of the transverse arm portions 183a, 183b can include a blade 184 that is offset upwardly from the processed layers of additive material by the target thickness of the next layer. In a typical conventional arrangement, the blade 184 may be formed from a hard material, such as steel, or a soft material, such as rubber. A drawback associated with the hard material is that it can damage the existing structure formed on the build platform 172 as it passes over that structure to lay down the next additive material layer. A drawback associated with the soft material is that it can quickly wear out as it passes over the hardened material formed on the build platform, and accordingly, must periodically be replaced.

Unlike either of the foregoing conventional arrangements, some embodiments of the present technology include a blade 184 that is replenishable during operation and/or with a reduced amount of machine downtime. For example, as shown in FIG. 8A, the blade 184 can be made from an elongated strip of rubber (or any other suitable material) that is initially rolled on a supply reel 185. The material forming each blade 184 is unrolled, fed through and held in place by the corresponding transverse arm portion 183a, 183b, and attached to a take up reel 190, which is powered by a motor 191. During operation, a pre-use portion 184a of the blade 184 moves into position at the recoater arm 183 to form an in-use portion 184b. The in-use portion 184b is soft enough so as not to damage already-formed additive material structures, and can be automatically replenished to reduce the time required to replace it. For example, as the in-use portion 184b wears out, it is moved away from the recoater arm 183 (forming a post-use portion 184c) which is rolled onto the take up reel 190. In this manner, the blade material can be continuously replenished without halting operation of the system 100. In particular embodiments, the blade material is advanced by a certain distance each time the powder application chamber 187 passes over the build platform 172. In other embodiments, the blade material can be continuously advanced as the recoater arm 183 passes over the build platform 172. In any of these embodiments, the amount of time required to provide the recoater arm 183 with fresh blade material is significantly reduced compared to conventional methods.

In some embodiments, the additive material control system 180 includes a sensor system 192 configured and positioned to determine the level of additive material 195 in the application chamber 187. For example, the sensor system 192 can include multiple emitters 193 and corresponding detectors 194. The emitters 193 can direct light beams (or other electromagnetic energy beams) across the chamber 187 where they are detected by the corresponding detectors 194. If the beam is interrupted, the level of the additive material 195 exceeds the height of the emitter 193, and if the beam is uninterrupted, it is below that level. Accordingly, the sensor system 192 can include multiple pairs of emitters 193 and receivers 194 at different elevations to determine (a) when the amount of additive material 195 is too low and (b), as the application chamber 187 is being filled, when the proper amount or level has been reached. More specifically, first emitters 193a and detectors 194a can detect a low level of additive material 195, and second emitters 193b and detectors 194b can detect a high level of additive material 195. In other embodiments, the sensor system 192 can include other types of sensors (e.g., weight sensors, and/or inductive and/or comparative sensors) in addition to or in lieu of the optical sensors described above. For example, inductive sensors can produce a voltage change when nearby objects moved toward or away from the sensor, and can be easier to implement than the emitters and receivers described above.

Figure 8B:
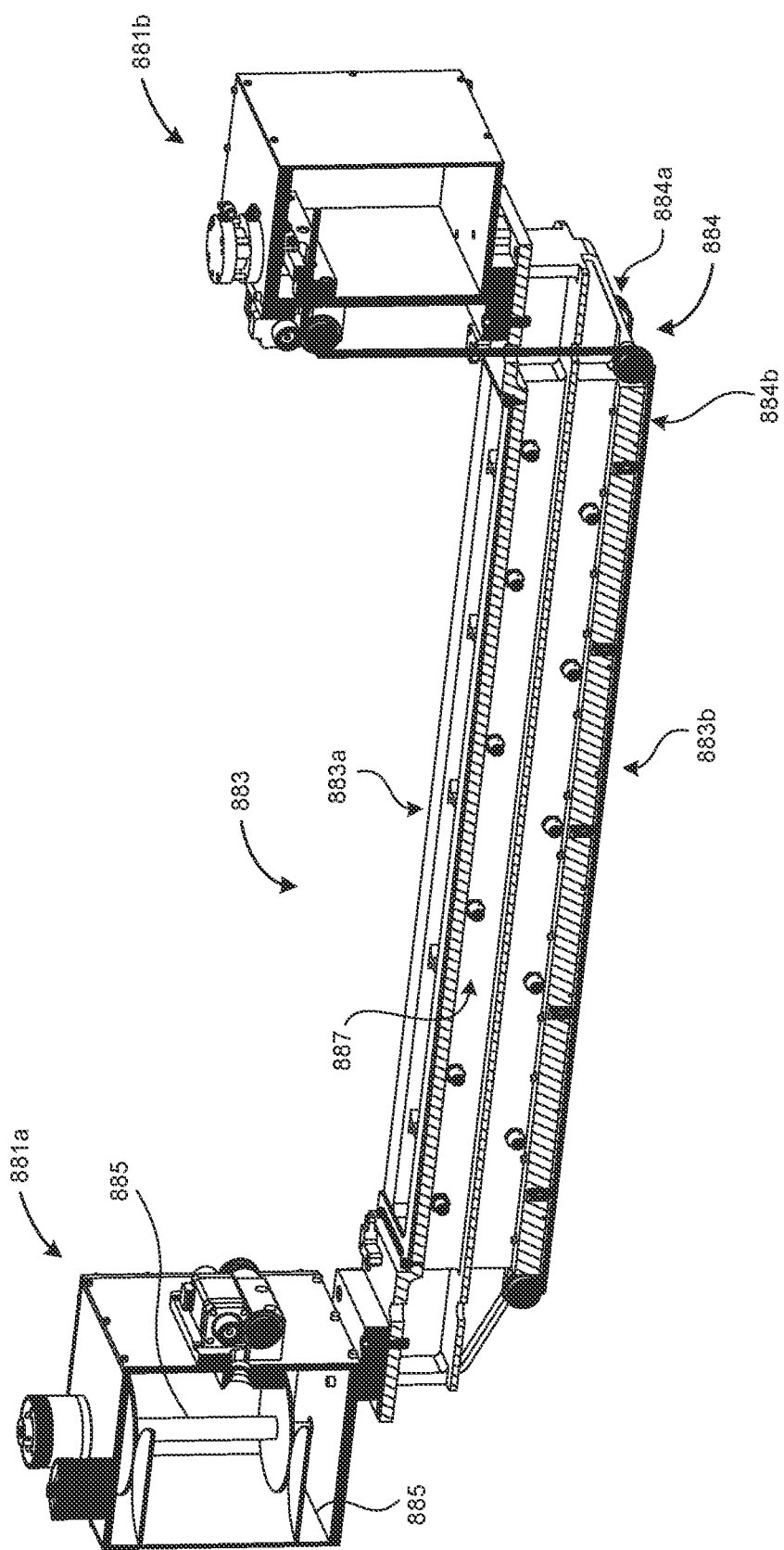
FIG. 8B is a partially schematic, cross-sectional illustration of a recoater arm and replenishable blade, configured in accordance with some embodiments of the present technology.

FIG. 8B is a partially schematic, partially cut-away illustration of a recoater arm 883 configured in accordance with some embodiments of the present technology. The recoater arm 883 can include two transverse arm portions 883a, 883b which partially delineate the powder application chamber 887 between them. A supply device 881a supplies two replenishable blades 884, shown as a first blade 884a and a second blade 884b to the recoater arm 883, and a take-up device 881b receives the used blades 884. As shown in FIG. 8B, the supply device 881a can include two supply reels 885 (a portion of one is seen in cross-section). As described further below with reference to FIG. 8C, the take-up device 881b can cut off used portions of the blade 884, rather than storing them on a reel.

Figure 8C:
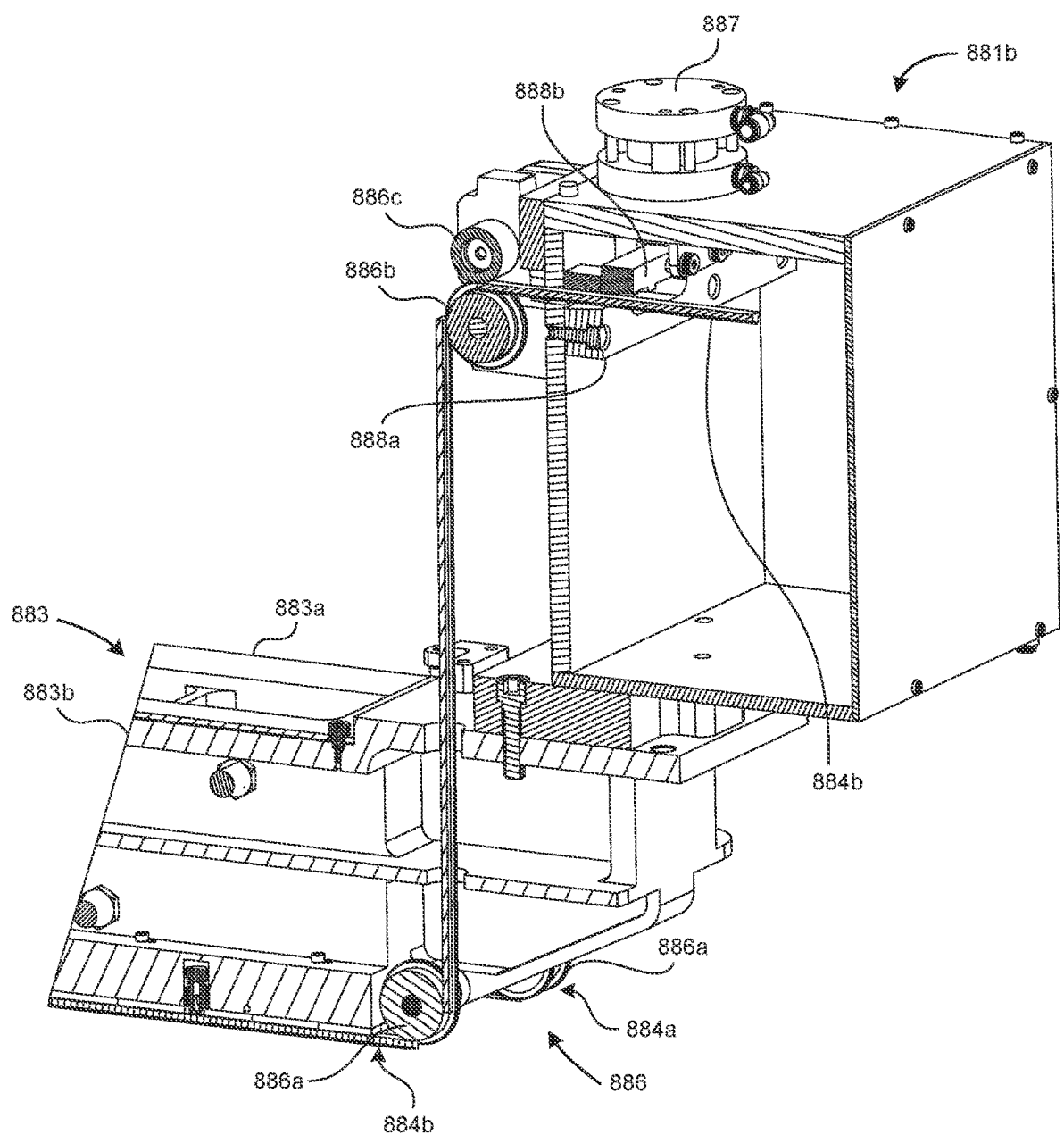
FIG. 8C is an enlarged illustration of a portion of the recoater arm shown in FIG. 8B, illustrating further details of a take-up device configured in accordance with some embodiments of the present technology.

Referring now to FIG. 8C, the recoater arm 883 can include multiple guide rollers 886 to guide the motion of the replenishable blades 884a, 884b. For example, first rollers 886a guide the replenishable blades 884 upwardly from the transverse arm portions 883a, 883b to the take-up device 881b. At the take-up device 881b, second and third guide rollers 886b, 886c receive the replenishable blade 884 and direct it over a shear support 888a and under a shear blade 888b, which together can form a cutter. An actuator 887 moves one or both of the shear support 888a and the shear blade 888b to cut off the incoming used portions of the blades 884. The second and third guide rollers 886b, 886c can also be used to tension the corresponding blades 884, together with the corresponding supply reels 885 located in the supply device 881*a* shown in FIG. 8B.

Figure 8D:
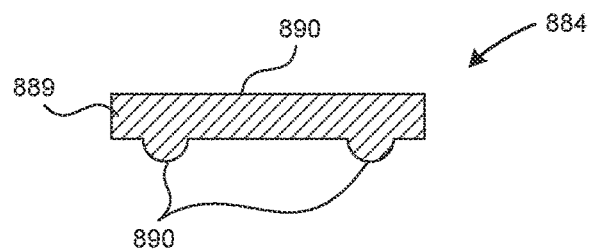
FIG. 8D is a partially schematic, cross-sectional illustration of a representative replenishable blade, configured in accordance with some embodiments of the present technology.

FIG. 8D is a partially schematic, cross-sectional illustration of a representative replenishable blade 884. The blade can include a generally rectangular body 889 and one or more protrusions 890 that extend downwardly from the body 889. [The protrusions 890 can provide the primary interface between the blade 884 and the powder bed.] The presence of two replenishable blades 884 allows the recoater arm 883 to efficiently distribute powder over the powder bed in two opposing directions rather than in a single direction, which improves the overall efficiency of the recoating process.

Figure 9A:
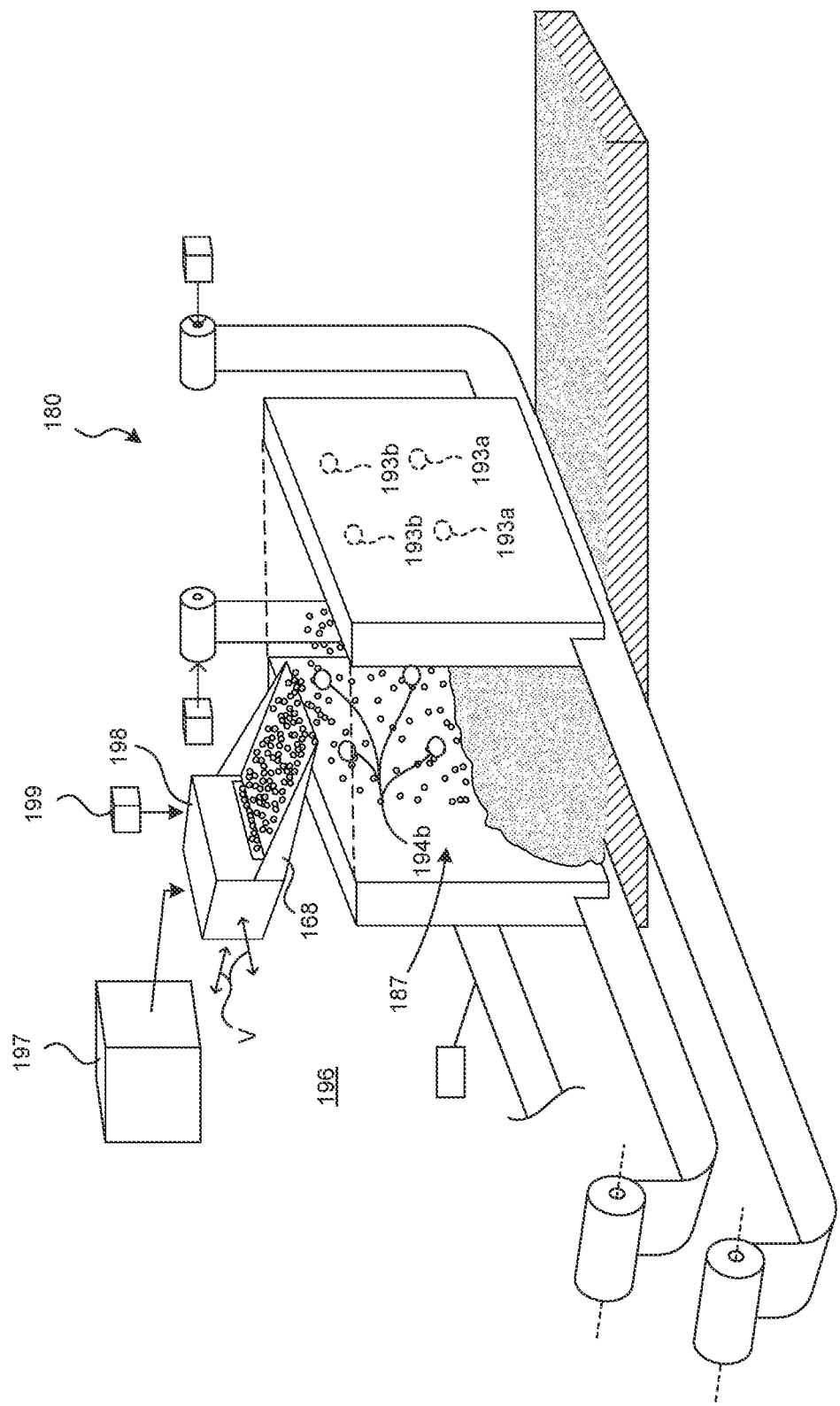
FIG. 9A is a partially schematic illustration of a replenishing station configured to operate in accordance with some embodiments of the present technology.

FIG. 9A is a partially schematic illustration of a representative additive material control system 180 during a process of refilling the application chamber 187 in accordance with some embodiments of the present technology. During the process, the application chamber 187 can be positioned at a replenishing station 196, which includes a powder source 197 coupled to a powder delivery device 198. In some embodiments, the powder delivery device 198 includes a chute 168 coupled to an actuator 199. During delivery, the actuator 199 vibrates or oscillates the powder delivery device 198, as indicated by arrows V, causing the powdered additive material 195 to travel down the inclined surface of the chute 168 and into the powder application chamber 187. This is unlike some conventional arrangements in which gears or other rotating or movable elements have direct contact with the additive material powder 195, which interferes with the operation of the devices. As shown in FIG. 9A, the second emitters 193*b* and receivers 194*b* can be used to determine when the powder application chamber 187 is full and ready for continued use.

Figure 9B:
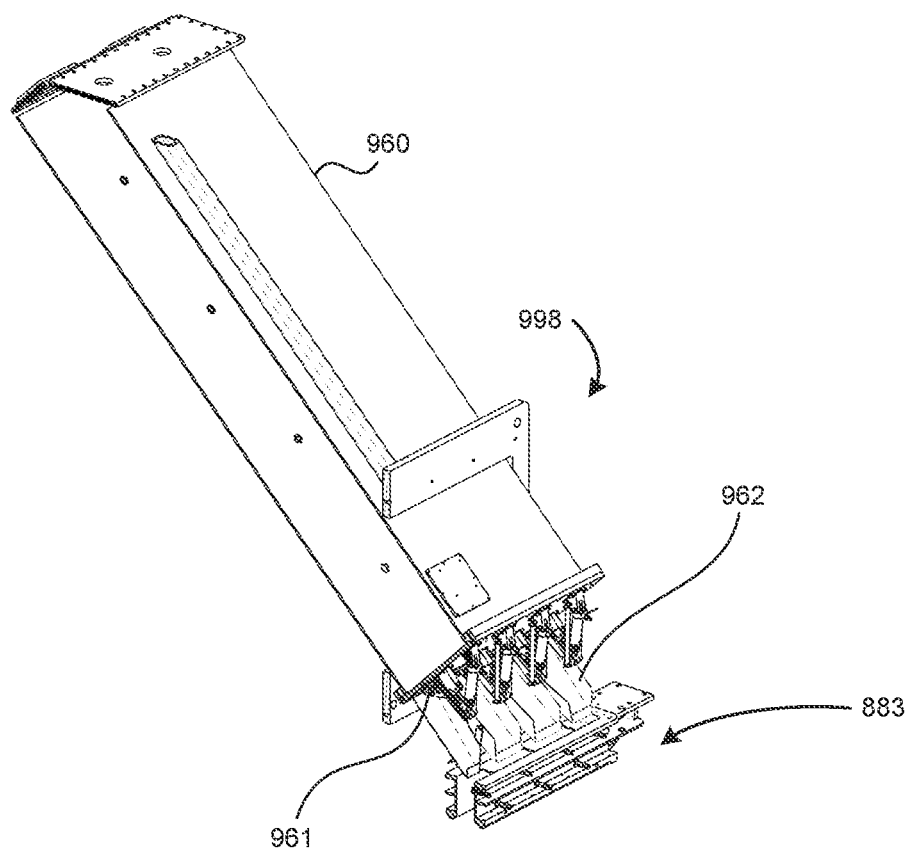
FIG. 9B is a partially schematic, partially cut-away illustration of a powder delivery device configured in accordance with some embodiments of the present technology.
Figure 9C:
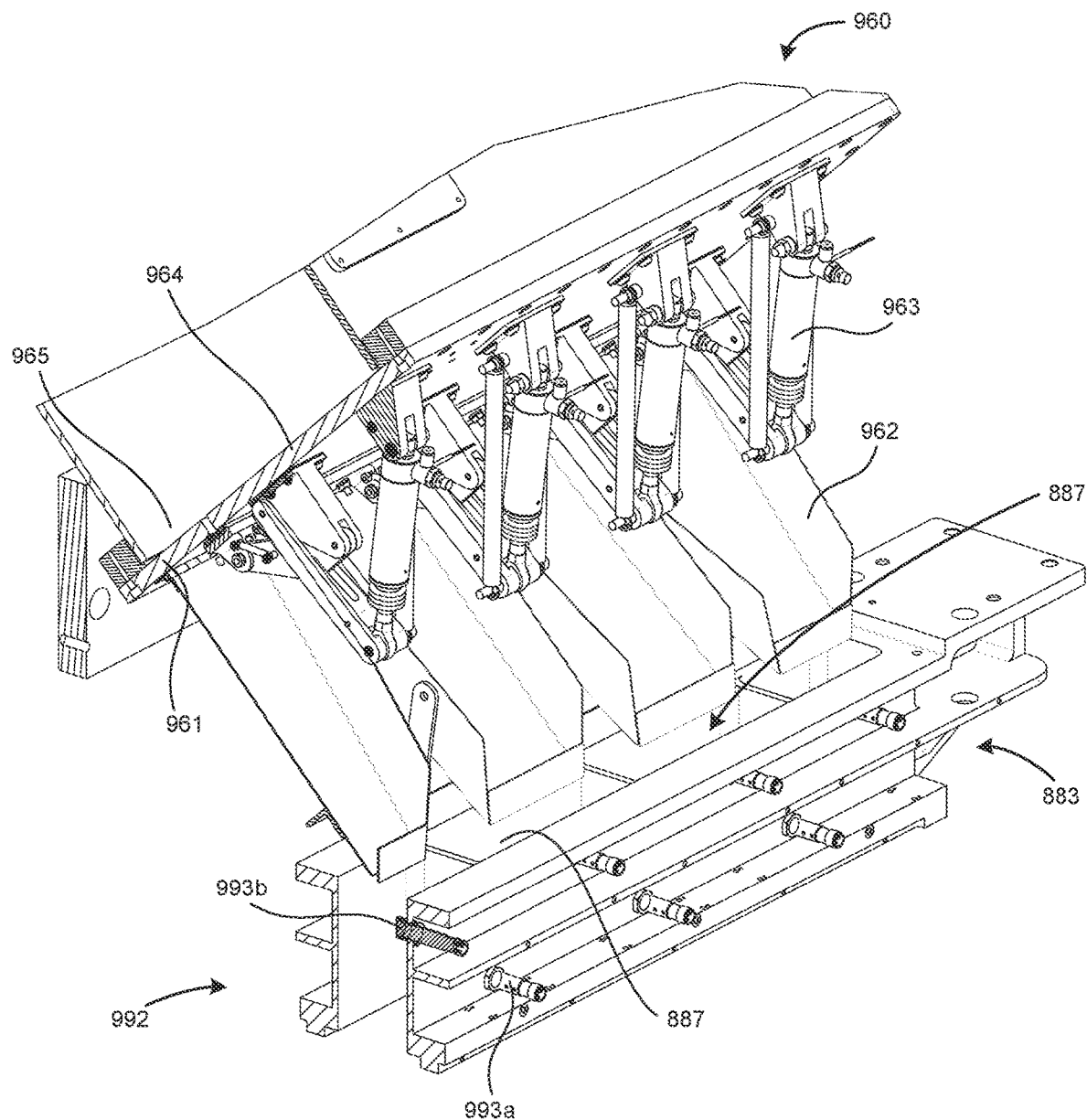
FIG. 9C is an enlarged illustration of a portion of the powder delivery device and recoater arm shown in FIG. 9B.

FIGS. 9B and 9C illustrate cross-sectional views of a representative powder delivery device 998 configured in accordance with some embodiments of the present technology. Referring first to FIG. 9B, the powder delivery device 998 can include a hopper 960 having multiple gates 961 that open and close to control the flow of powder to corresponding chutes 962 and from the chutes 962 into the recoater arm 883. In a particular embodiment, the powder delivery device 998 includes six gates 961 and corresponding chutes 962 aligned along the length of the recoater arm 883. Three complete gates 961 and chutes 962 are shown in FIG. 9B, and a fourth gate 961 and corresponding chute 962 are shown in cross-section.

FIG. 9C is an enlarged illustration of the lower portion of the powder delivery device 998 shown in FIG. 9B. As shown in FIG. 9C, the hopper 960 includes a hopper end wall 964 having openings 965 which are selectively blocked and unblocked by the corresponding gates 961. Actuators 963 open and close the gates 961, e.g., via a four-bar linkage, or another suitable arrangement. The powder is delivered to the recoater arm 883, which includes a sensor system 992 that operates generally in the manner described above. Accordingly, the sensor system 992 can include emitters 993*a*, 993*b* corresponding to a low powder level and a high powder level, respectively, within the powder application chamber 887. The emitters 993 are paired with corresponding receivers, not visible in FIG. 9C.

By implementing multiple, independently controllable gates or other devices positioned along the length of the recoater arm 883, along with corresponding sensors, embodiments of the present technology can more accurately control the amount of powder delivered to the recoater arm 883. This approach can improve the efficiency with which the overall manufacturing process is conducted, particularly in instances for which the powder is used more rapidly at some portions of the recoater arm 883 than others (e.g., more rapidly at the center than at the edges). This result can occur when the geometry being formed is not uniform across the width of the corresponding build plate.

6. Automated Processing

FIGS. 10A-14B illustrate embodiments of a system 200 that includes automated features. The automated features can include any one or combination of the elements described above with reference to FIGS. 1-9C.

Figure 10A:
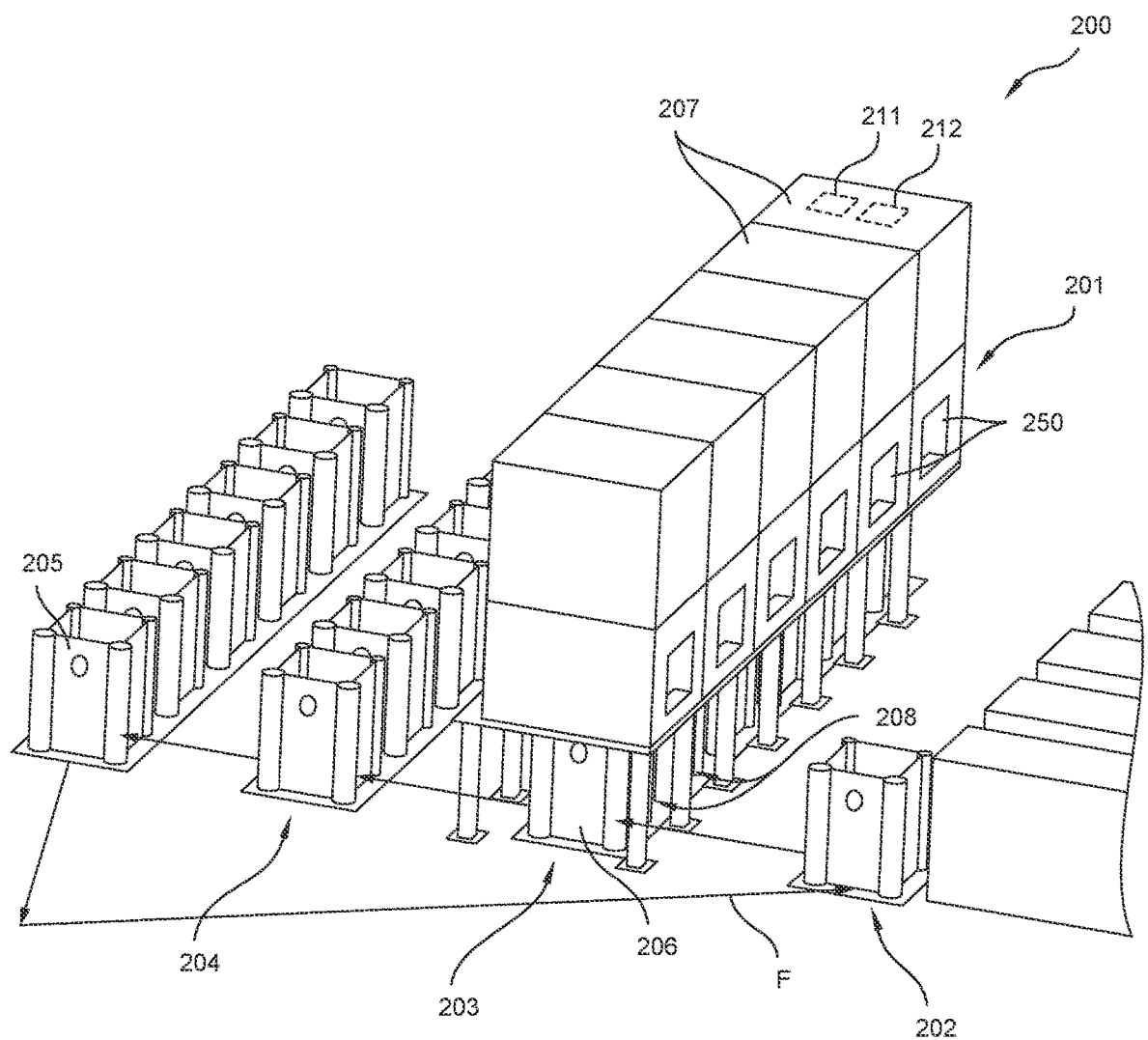
FIG. 10A is a partially schematic, isometric illustration of an automated or partially automated processing tool configured in accordance with some embodiments of the present technology.

Beginning with FIG. 10A, the system 200 can include a processing tool 201 that in turn includes multiple processing chambers 250 and corresponding chamber controllers 207. Each controller 207 can include one or more processors 211, memories 212, and corresponding elements (e.g. buses and other connecting circuitry) for sensing system conditions and directing system operations. Each processing chamber 250 can operate independently of the other processing chambers, under the control of the corresponding controller 207. Each processing chamber 250 can include a receiver 208 that receives a movable build container 206 which houses a support structure and build platform, e.g., in accordance with any of the configurations described above. The build container 206 can position the corresponding build platform at the processing chamber 250 for additive manufacturing processes, and can then move the manufactured part out of the processing chamber 250. Accordingly, the system 200 can include a pre-processing station 202 (where the movable build container 206 is prepared for operation), a processing station 203 (where the movable build container 206 interfaces with the processing chamber 250 to build the manufactured article), a powder removal station 204 (where excess additive powder is removed from the manufactured article), and a part removal station 205 (where the finished article is removed from the build platform). Each movable build container 206 can accordingly circulate among the stations described above, thus allowing the steps of pre-processing, manufacture, powder removal, and part removal to be carried out simultaneously on corresponding build platforms.

For purposes of clarity, the chambers and controllers associated with the powder removal station 204 and the part removal station 205 are not shown in FIG. 10, but may have an overall configuration similar to that of the processing station 203. At each station, individual build containers are received and attached to corresponding chambers for processing, then detach from the chambers so as to progress to the next station.

Arrow F illustrates a representative route for one build container 206, and the system can include multiple, generally parallel routes for each of the other build containers. The system can also include one or perpendicular routes along the routes indicated by arrow F to allow build platforms to move any suitable/available position in a 2-dimensional array. This flexibility can allow for increased (e.g., optimized or maximized) utilization of each chamber. The build containers can move along predefined tracks in some embodiments. In some embodiments, the tracks can be replaced or supplemented with a robotic or otherwise automated track-less vehicle that can move to any suitable position (e.g., chamber) in the 2-dimensional array, with more flexibility than a track system.

Figure 10B:
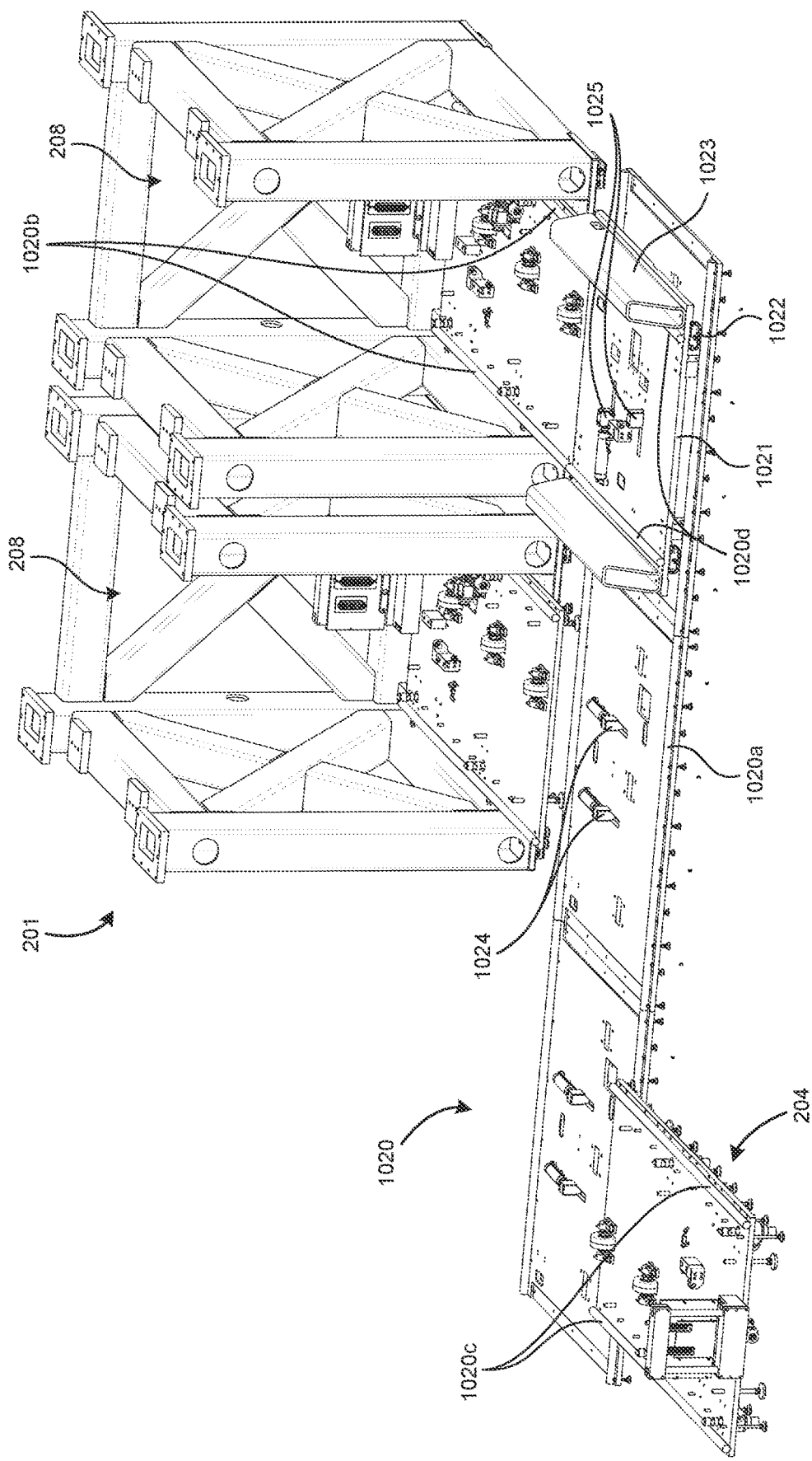
FIG. 10B is a partially schematic illustration of portions of a processing tool and arrangement for moving build containers among processing tool stations, in accordance with some embodiments of the present technology.

FIG. 10B illustrates a particular implementation for a processing tool 201 in which tracks 1020 are used to guide a transporter 1021 among the stations of the overall tool. For example, the tracks 1020 can include a first track 1020*a* that supports a transporter 1021 via wheels 1022. The transporter 1021 can accordingly move back and forth along the first track 1020*a* between multiple receivers 208 and one or more powder removal stations 204 and/or other stations. Each receiver 208 can include a corresponding second track 1020*b* and the powder removal station can include a third track 1020*c*. The transporter 1021 can include upwardly projecting stiffening elements 1023 to accommodate the weight of the build container that it carries. The build container is carried on a fixed transporter track 1020*d* so that it can be easily moved on and off the transporter 1021. The fixed transporter track 1020*d* is vertically aligned with the second track 1020*b* and third track 1020*c*. When the transporter 1021 is transversely aligned with one of the receivers 208 along the first track 1020*a*, as shown in FIG. 10B, the transporter track 1020*d* aligns with the second track 1020*b*, allowing the build container to be rolled off the transporter 1021 and into the receiver 208. Build container positioning elements 1025 can lock the build container in position on the transporter 1021, and can be actuated to unlock the build container and allow it to be moved into the receiver 208. Transporter positioning elements 1024 can also be actuated to allow or prevent movement of the transporter 1021 along the first track 1020*a*. A similar arrangement can be used to move build containers among stations other than those shown in the representative illustration of FIG. 10B.

In any of the foregoing embodiments, the tracks can include multiple rails (e.g., two, as shown in FIG. 10B), or a single rail. An advantage of embodiments of the foregoing arrangement is that the perpendicular orientation of the rails can simplify the system layout, and the fixed transporter rail is simpler to implement than a turntable or other movable device.

Figure 11:
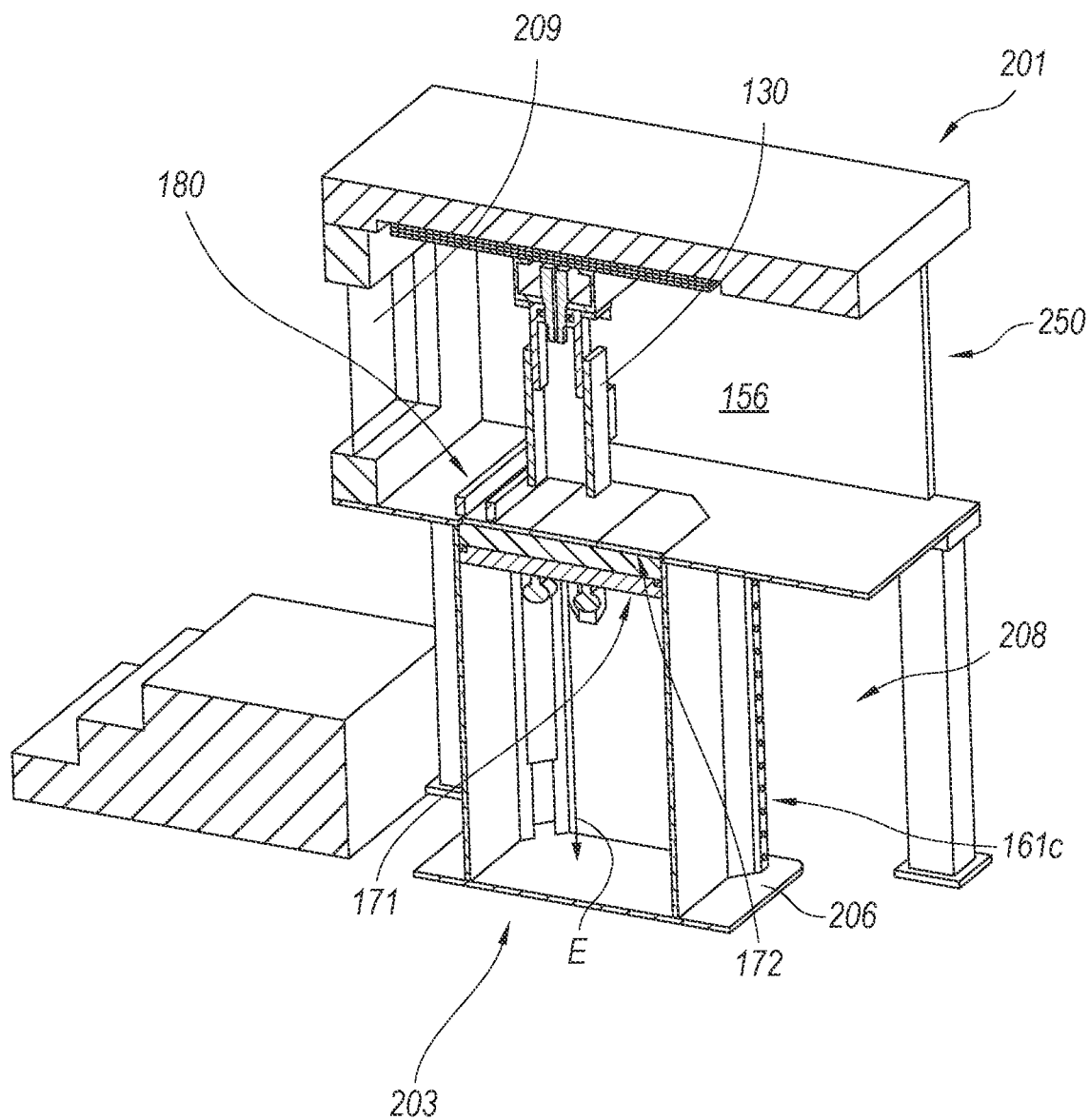
FIG. 11 is a partially schematic, partially cut-away illustration of a processing tool having a processing station configured in accordance with some embodiments of the present technology.

FIG. 11 is a partially schematic, cut-away illustration of a movable build container 206 at a representative processing station 203. The processing station 203 includes a head 130, processing chamber 250, and additive material control system 180 having characteristics in accordance with any of the embodiments described above. The movable build container 206 carries a support element 171, which in turn carries the build platform 172 so that the build platform 172 is exposed to the chamber volume 156 within the processing chamber 250, and is accessible to the head 130. One or more third actuators 161*c* move the support element 171 downwardly as indicated by arrow E as subsequent layers of additive material are deposited on the build platform 172. When the movable build container 206 is removably installed at the processing station 203, it forms part of the processing chamber 250. An operator or observer (not shown) can monitor the process taking place within the chamber 250, e.g., via a window 209, and can optionally start, stop and/or otherwise control the process.

Figure 12:
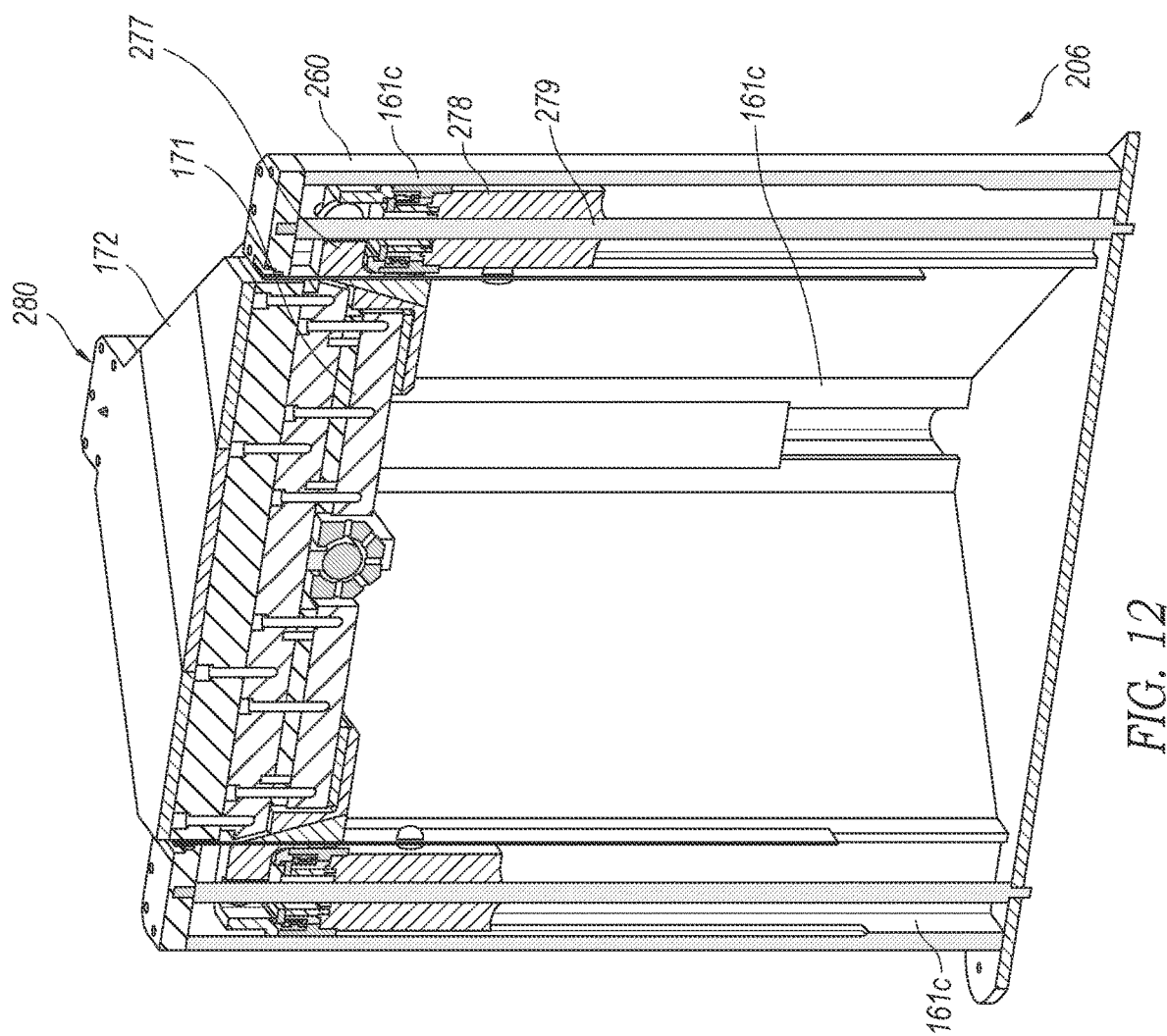
FIG. 12 is a partially schematic, cut-away illustration of a movable build container and associated elements, configured in accordance with some embodiments of the present technology.

FIG. 12 is a cross-sectional illustration of the build container 206, cut along a diagonal line and illustrating two actuators 161*c* that control the vertical motion of the build platform 172, and one or two rails (e.g., linear rails) 280 that guide the motion of the build platform 172. Each of the two actuators 161*c* can be contained in a corresponding housing 260 and can include a stationary ball screw 279 that extends upwardly along the corners of the build container 206, and a hollow core motor 278 that rotates clockwise or counterclockwise to move up and down the stationary ball screw 179. The hollow core motor 278 engages with a support arm 277 that moves linearly up and down and carries the support element 171 and build platform 172 with it.

Figure 13:
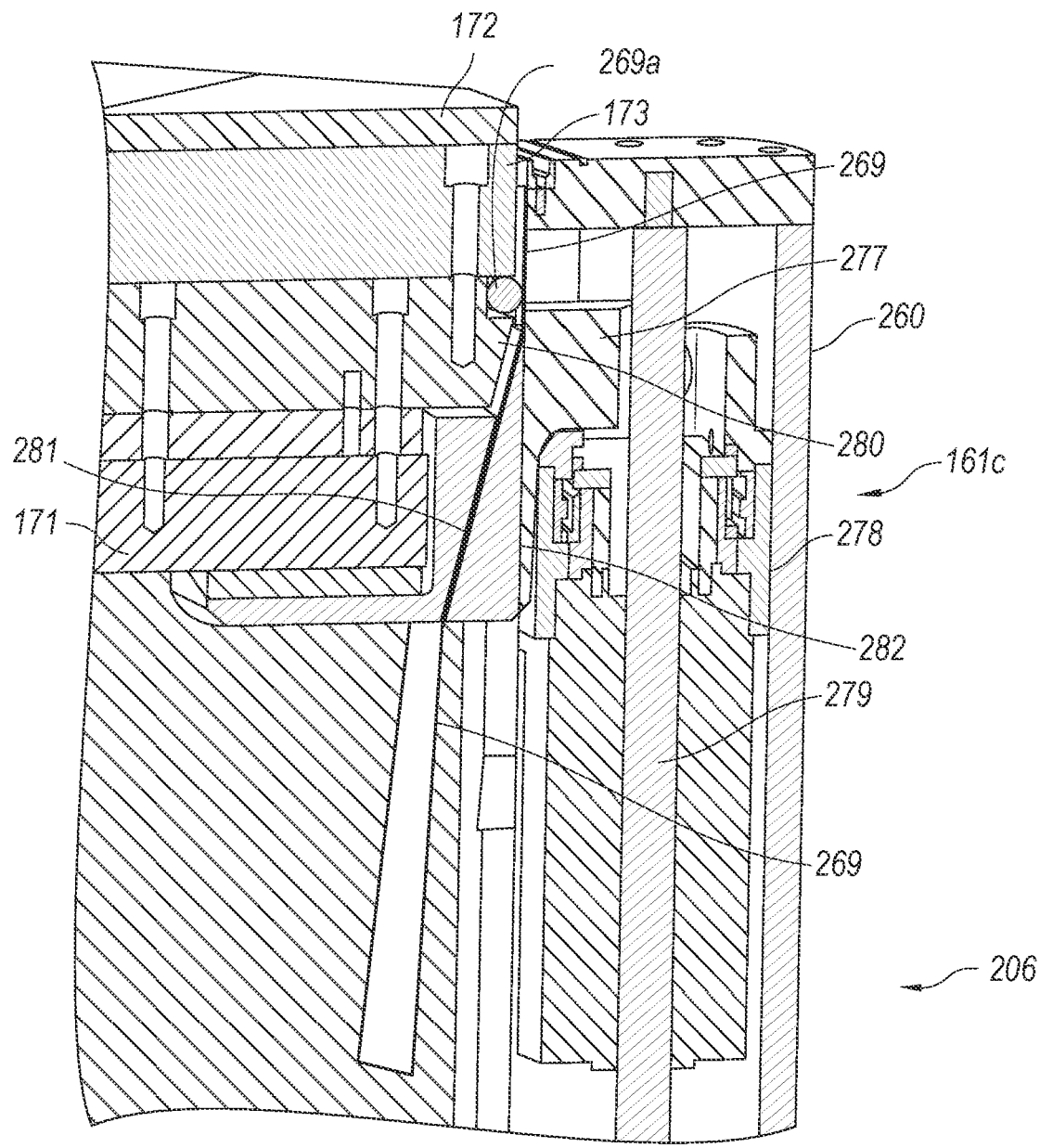
FIG. 13 is an enlarged illustration of a portion of the arrangement shown in FIG. 11

FIG. 13 is an enlarged illustration of a portion of the build container 206 shown in FIG. 12. In addition to the elements described above with reference to FIG. 12, FIG. 13 illustrates a seal strip 269 that is magnetically positioned between the build plate 172 and the internal elements of the actuator 161*c*. Accordingly, the seal strip 269 can protect the internal elements of the actuator 161*c* from contamination by powdered additive build material. The seal strip 269 is held magnetically to the corner walls and breaks away from the magnets to travel through the ramped slot 281 in the ball screw or linear rail knuckle 282 allowing the knuckle to hold the build platform to the ball screw motor or linear rail and maintain a seal to prevent powder from getting on the ball screw or linear rails. A further seal 269*a* positioned above the knuckle 282 seals the interface between the actuator 161*c* and the build plate 172/support element 171, while the seal strip 269 seals the vertical slot in which the support arm 277 moves.

Figure 14A:
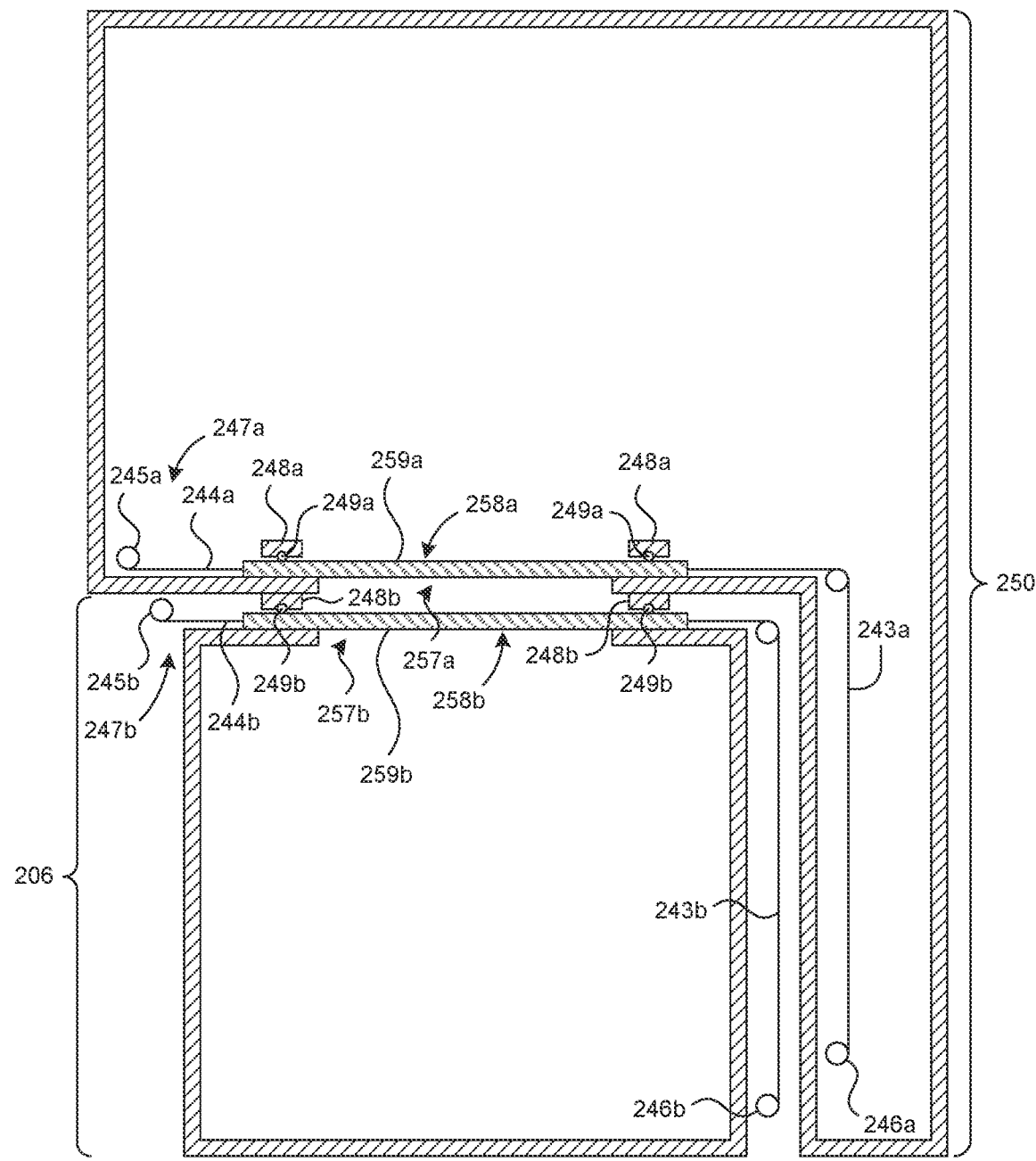
FIGS. 14A and 14B are schematic illustrations of an arrangement for sealing a movable build container and associated processing chamber in accordance with some embodiments of the present technology.
Figure 14B:
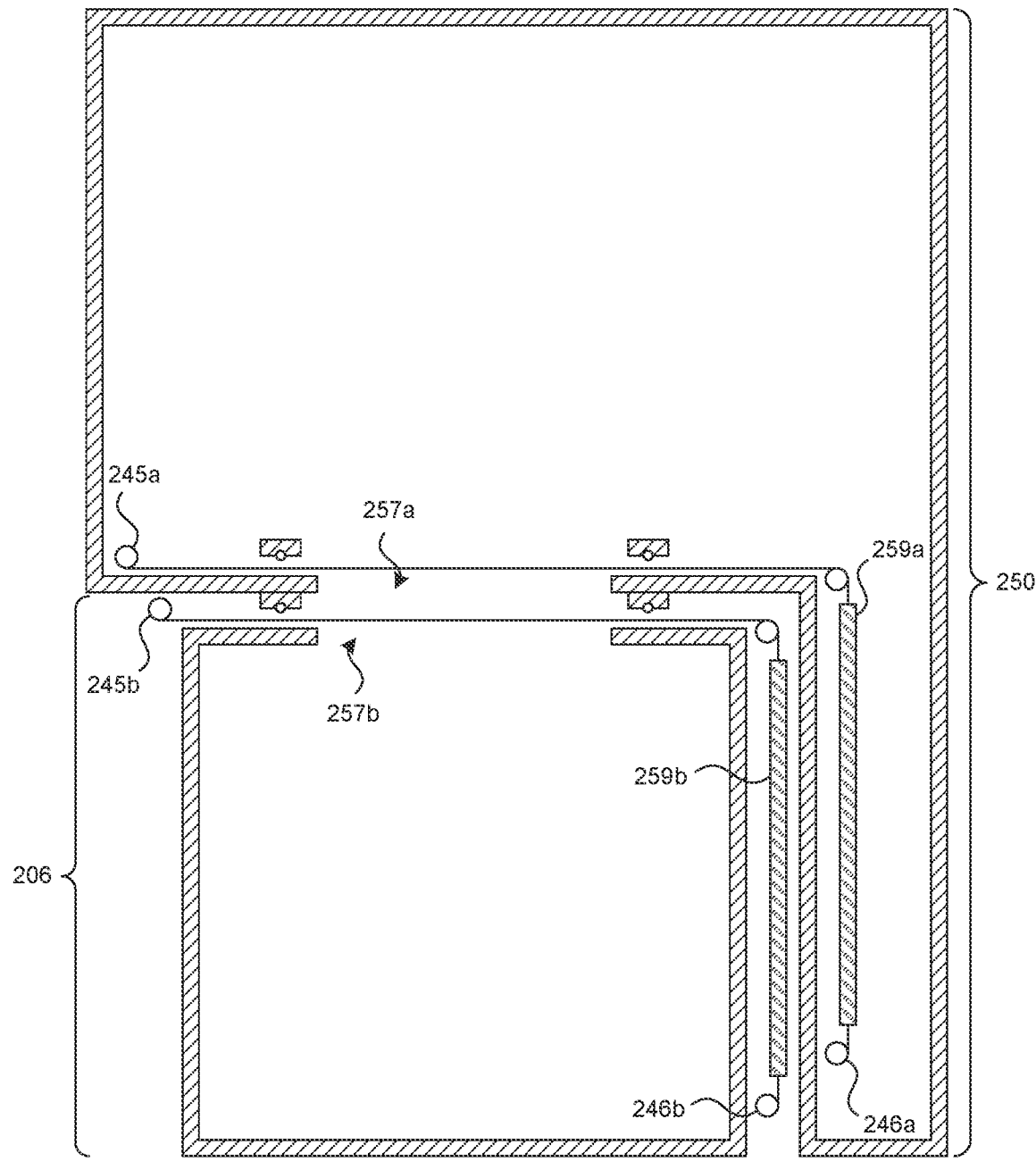

FIGS. 14A and 14B schematically illustrate cross-sectional views of a representative build container 206 and processing chamber 250 configured to selectively permit and prevent fluid communication between them. Beginning with FIG. 14A, the processing chamber 250 can include a chamber aperture 257*a* that is aligned with a corresponding container aperture 257*b* of the build container 206 when the build container 206 is positioned for processing. The processing chamber 250 includes a movable or actuatable closure device 258*a*, and the build container 206 includes a corresponding closure device 258*b*, both of which can be selectively opened and closed. In a particular embodiment, the closure devices 258*a*, 258*b* include shutters 259*a*, 259*b* connected to corresponding actuators 247*a*, 247*b*. For example, each actuator 247*a*, 247*b* can include a "close" reel 245*a*, 245*b* attached to the corresponding shutter 259*a*, 259*b* with a corresponding first connector 244*a*, 244*b*. When the close reels 245*a*, 245*b* are actuated (e.g., by rotating clockwise), they draw the corresponding shutters 259*a*, 259*b* across the corresponding apertures 257*a*, 257*b*, as shown in FIG. 14A. The actuators 247*a*, 247*b* can also include corresponding "open" reels 246*a*, 246*b* connected to the opposite ends of the shutters 259*a*, 259*b* with corresponding second connectors 243*a*, 243*b*. When rotated clockwise, the open reels 246*a*, 246*b* draw the corresponding shutters 259*a*, 259*b* downwardly and away from the corresponding apertures 257*a*, 257*b* to allow for fluid communication between the build container 206 and the processing chamber 250, as shown in FIG. 14B.

The representative system shown in FIGS. 14A and 14B can further include seals that are selectively activated when the apertures 257*a*, 257*b* are closed, and deactivated when the apertures 257*a*, 257*b* are opened. Accordingly, referring again to FIG. 14A, the processing chamber 250 can include a seal 249*a* carried by a seal support 248*a*, and the build container 206 can include a corresponding seal 249*b* carried by a corresponding seal support 248*b*. Each seal 249*a*, 249*b* can extend around the entire circumference of the corresponding aperture 257*a*, 257*b*, and can be inflated or/and deflated, or otherwise actuated to selectively seal and unseal the corresponding shutter 259*a*, 259*b*.

In particular embodiments, the shutters 259*a*, 259*b* include a thin flexible material, for example, a semi-transparent polyurethane or stainless steel. The connectors 244*a*, 244*b*, 243*a*, 243*b* can include cables or other suitable devices. The actuators 247*a*, 247*b* can be operatively coupled to each other and/or combined in order to coordinate the operation of the chamber shutter 249*a* and the container shutter 249*b*. In particular embodiments, the shutters 249*a*, 249*b* can have a vertical orientation when in the open position. In other embodiments, the shutters 249*a*, 249*b* can have other orientations (e.g., horizontal). In still further embodiments, the shutters 249*a*, 249*b* can be rolled up on the corresponding open reels 246*a*, 246*b* to open the corresponding apertures 257*a*, 257*b*. In such an embodiment, the open reel 246*a*, 246*b* can be unpowered (but spring-loaded), while the close reels 245*a*, 245*b* are powered. In other embodiments, the powered/unpowered split can be reversed. In still further embodiments, the closure devices 257*a*, 257*b* can include a different arrangement. For example, the closure devices 257*a*, 257*b* can include an iris arrangement, with overlapping iris leaves that operate in the manner of a camera iris. In another example, the open and close reels can be replaced with a single spring-actuated reel that operates in the manner of a tape measure or roll screen.

An advantage of the closure devices described above is that they can maintain a volume of inert gas within the processing chamber 250 and/or the build container 206. Accordingly, the additive material in the build container 206 can be protected from exposure to the atmosphere as the build container 206 is moved from one chamber to another, while also allowing communication with the corresponding processing chamber 250 when needed for processing. This advantage may be particularly significant for additive materials containing titanium, aluminum, copper and/or other elements or compounds that react with air. Another advantage of embodiments of the present technology is that because the processing chamber 250 and the build container 206 can each be individually purged and sealed, when the processing chamber 250 and build container 206 are joined and the apertures 257*a*, 257*b* opened, little or no additional purging is required before the processing operation begins. This arrangement can accordingly reduce flow times for the overall automated operation. The foregoing arrangement can be applied to a processing chamber 250, as shown in FIGS. 14A and 14B, and can be applied to other chambers of the overall system (e.g., the powder removal station), in addition to or in lieu of the processing chamber 250.

7. Laser Marking and Calibration

Figure 15:
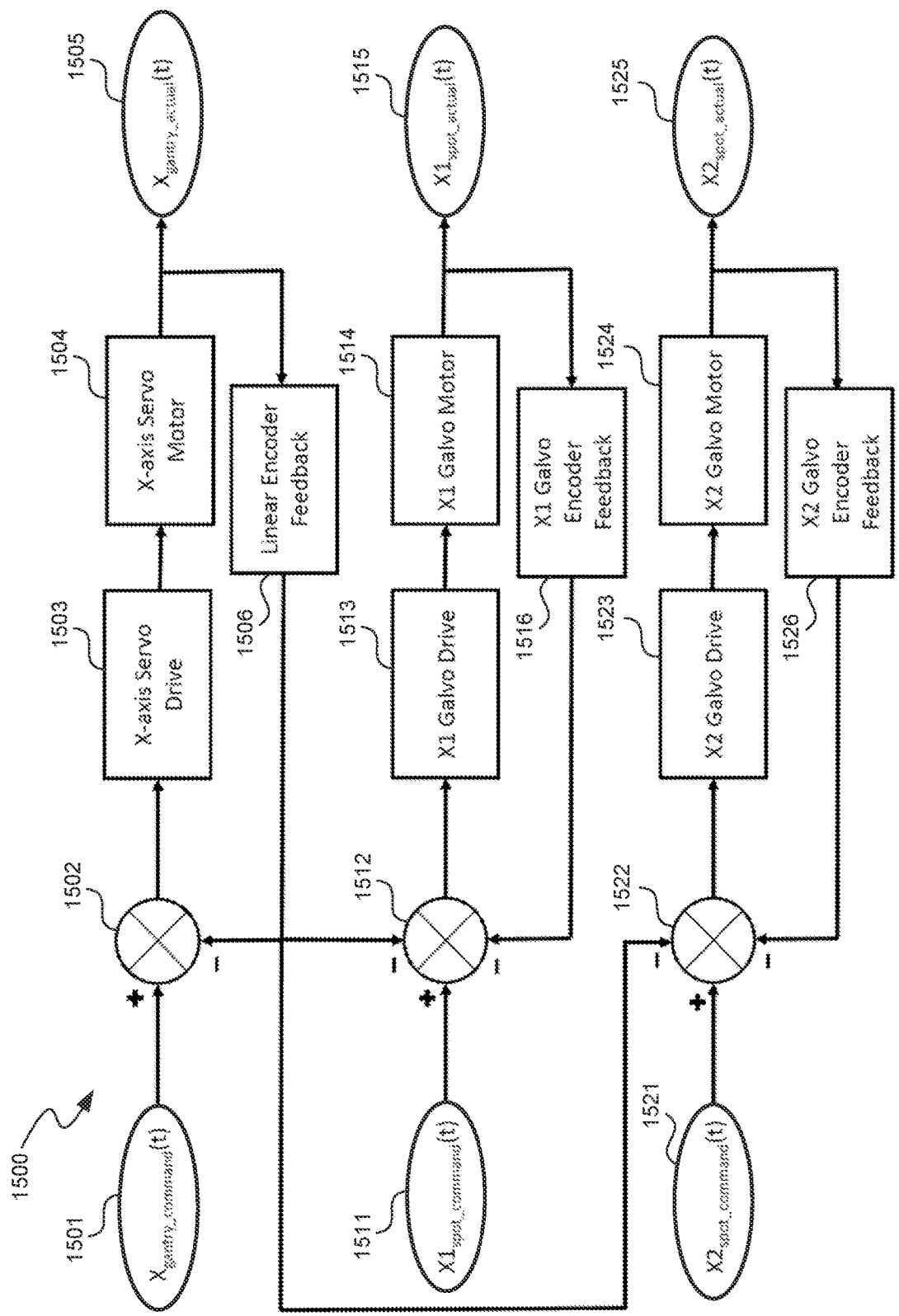
FIG. 15 is a schematic illustration of an arrangement for positioning laser beams in accordance with some embodiments of the present technology.

As described above with reference to FIGS. 1 and 2B, an overall representative system 100 can include a gantry 162 that translates into and out of the plane of FIG. 1, a laser head 130 that translates left and right as shown in FIG. 1, and actuators 139*a*, 139*b*, and 139*c* that direct corresponding laser beams to form corresponding spots on the additive material layer 181. In particular embodiments, the actuators 139*a-c* can include galvanometers or "galvos" and in other embodiments, can include other types of actuators. In any of these embodiments, the location of an individual laser spot on the additive material layer 181 is a function of the gantry position, the head position, and the position of the individual actuator(s) associated with orienting the corresponding laser beam. In particular embodiments, it is desirable to ensure that the actual position of the laser spot matches the target position of the laser spot. FIG. 15 illustrates a representative technique in accordance with the present technology for reducing or eliminating the error in the position of the laser spot.

FIG. 15 illustrates a process 1500 that uses feedback to more accurately position each laser spot based on input received from the gantry, the laser head, and the individual laser beam actuators. The overall command to move a laser spot to a particular x-y location requires moving the gantry, the laser head and/or the individual laser beam actuator in a manner that has an x-axis component result and a y-axis component result, for each laser beam. For purposes of illustration, a process for adjusting the x-axis components for two laser beams is illustrated in FIG. 15. A similar approach can be used for the y-axis components, and for additional laser beams. The effect of the process is to prevent or reduce the extent to which positioning errors at the gantry propagate to positioning errors for the laser spot. For purposes of illustration, several aspects of the representative examples below are provided in the context of position adjustments. The approach is also applicable to velocity adjustments, alone or in combination with position adjustments.

At block 1501, the process includes issuing a gantry position command having an x-axis coordinate value. Accordingly, with reference to FIG. 1, the x-axis coordinate is controlled by the first actuator 161*a*, which moves the laser head 130 along the gantry 162. At a first summation block 1502, the command is summed with a feedback input, described immediately below. The summed command is directed to an x-axis servo drive or other controller (block 1503) which drives the x-axis servo motor or other actuator (block 1504) to produce an actual position along the x-axis (block 1505). A feedback device, for example, a linear encoder, registers the actual position (along the x-axis) at block 1506, and provides feedback to the summation block 1502.

At block 1511, a first laser spot is commanded to move in a direction that includes an x-axis component x-direction. At a second summation block 1512, the command is summed with (a) the feedback from the gantry command, and (b) the first laser spot command, as described immediately below. The summed commands are directed to a drive or other controller for the first laser spot (block 1513) which is directed to the corresponding motor (block 1514), which in turn moves the laser spot to a position that includes an x-axis component (block 1515). At block 1516, a feedback device (e.g., a galvanometer encoder) detects the actual position along the x-axis and feeds this motion back to the second summation block 1512.

A similar process is executed for a second laser spot, and any further additional laser spots. Accordingly, at block 1521, the x-axis coordinate of the second laser spot is commanded, and summed (at a third summation block 1522) with feedback from the corresponding linear encoder (block 1506) and the feedback associated with the galvanometer controlling the second spot, as described immediately below. The summed signal is directed to a drive or other controller for the second laser spot (block 1523) which instructs the corresponding motor (at block 1524) to produce the actual x-coordinate location of the second spot (block 1525). A corresponding feedback device (e.g., a galvo encoder) measures the actual x-coordinate position of the second laser spot (block 1526) and provides this feedback to the third summation block 1522.

Accordingly, a representative overall process includes commanding a position and/or velocity of a laser spot, as a function of time. The command can include commanding a position and/or a velocity, as a function of time, of an energy beam head carrying at least one energy beam director across a bed of additive material powder, and commanding a position and/or a velocity, as a function of time, of at least one energy beam spot generated by the at least one energy beam director. The process can further include receiving feedback data corresponding to a measured position and/or velocity of the energy beam head, and moving the at least one energy beam spot toward a target position and/or toward a target velocity, as a function of time, using the feedback data. The foregoing process can be executed for x-axis and the y-axis coordinate of the gantry and the laser spots, and, as noted above, can be executed for each laser spot whether that be two, three, four, or more laser spots.

An advantage of the forgoing approach is that it allows "on-the-fly" calibration of the position of each laser spot so as to increase the accuracy with which the end product is built, e.g., by using feedback to reduce or eliminate error in the position and/or velocity of the laser spot. In particular, the generally fine resolution, faster-acting galvanometers can account for errors in the position of the slower and coarser servo drives in a dynamic manner to more quickly and continuously bring each laser spot to (or at least toward) its target location, at (or at least toward) its target velocity.

Figure 16:
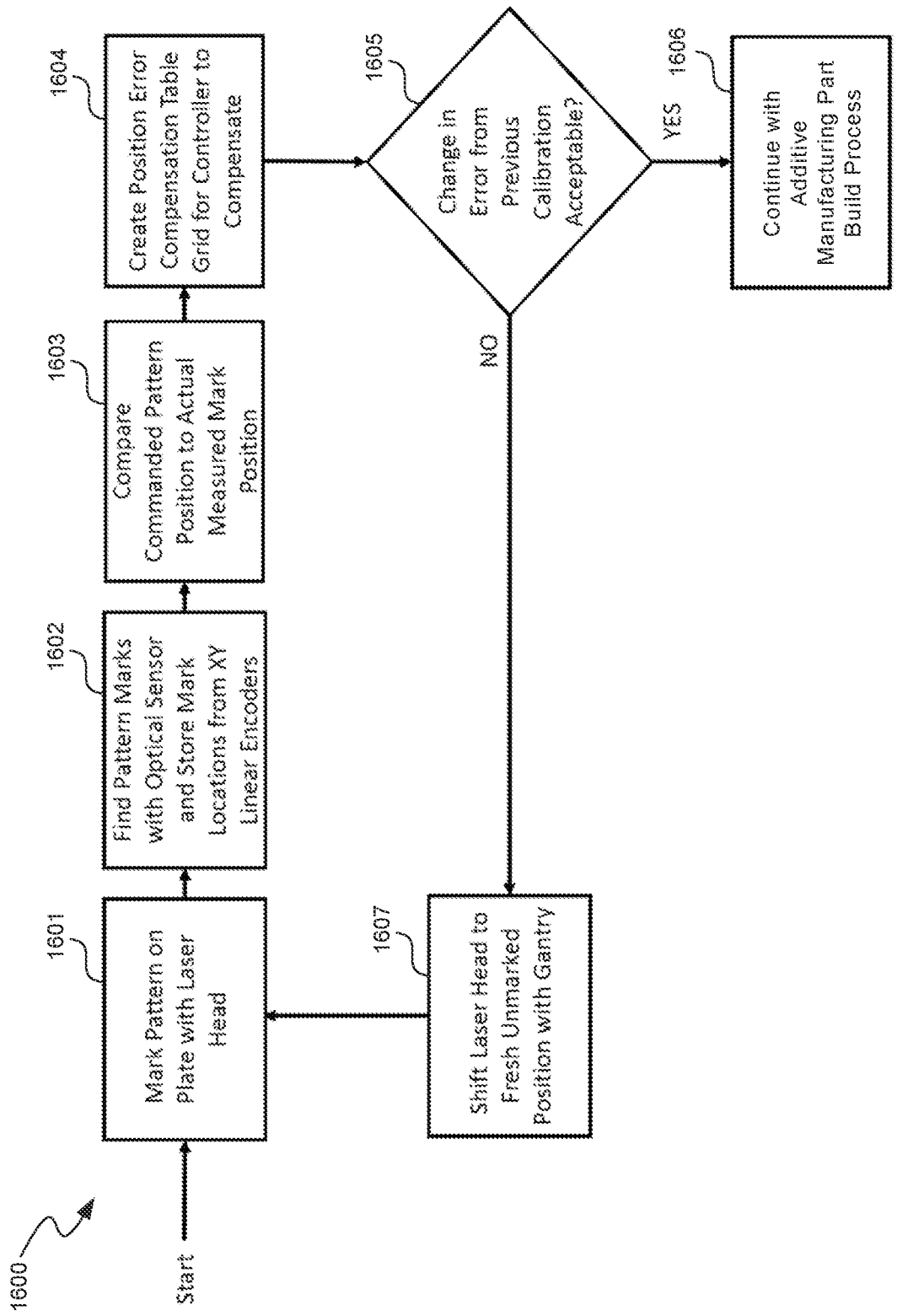
FIG. 16 is a block diagram illustrating a representative method for calibrating an additive manufacturing device in accordance with some embodiments of the present technology.

FIG. 16 illustrates a representative calibration technique 1600 in accordance with embodiments of the present technology. The calibration technique can be used to calibrate the individual actuators associated with each of the laser beams described above, for example, each of the galvanometers or other actuators shown in FIG. 2B. Block 1601 includes marking a pattern on a plate with the laser head. The pattern can be produced by a single one of the lasers described above, and the process can be repeated for each of the lasers. In a particular embodiment, the pattern includes a grid or other arrangement of spots, within a selected area. For example, the spots can be located within the projection of the nozzle inner surface 116 on the additive material layer 181 shown in FIG. 3. In a representative embodiment, the marks can include a grid of tens, hundreds, or thousands of spots within the selected area. The spots can be made on an actual build plate, or on a sacrificial plate, for example, a glass plate with a layer of paint or other suitable coating that is sensitive to the wavelength of the laser light.

Once the marks are formed, then at block 1602, the marks are located. The marks can be located via a number of suitable techniques, for example, laser interferometry, or optical metrology. Laser interferometry, which identifies only distance, may be a simpler and more robust approach. Using optical metrology (e.g., taking an image of the plate and using pattern recognition techniques to identify the center of each individual spot), may be more accurate. Regardless of the technique used, the x and y locations of the individual spots are identified using, for example, the encoders described above with reference to FIG. 15. These locations correspond to the actual measured location of the mark.

At block 1603, the commanded pattern positions and the actual measured mark positions are compared, and at block 1604, the error values resulting from the comparison are tabulated, for example, in a tabular grid or other compensation table or data structure.

At block 1605, the error values in the table are compared with the values obtained in a prior iteration to determine if the error or change in error is within an acceptable limit. If so, then at block 1606, the calibration process is completed and the additive manufacturing process begins.

If the error is not within acceptable limits, then at block 1607, the laser head is shifted to an unmarked position, via the gantry (e.g., by moving the gantry and/or moving the laser head relative to the gantry). At block 1601, a new pattern is then marked on the plate, using the position error values from the compensation table (block 1604) and the process is repeated until the error improvement is within acceptable limits.

The foregoing process can be repeated for each of the individual laser beams to calibrate each laser director. In some embodiments, the gantry is used only to move the location of the spots from a marked region to an unmarked region as the iteration progresses. In other embodiments, the gantry can be used to recalibrate the laser spot location at multiple positions over the motion range of the laser head and/or gantry, for example, if the results vary from one laser head position to another.

One feature of the foregoing arrangement is that the calibration process can be fully automated. In particular, the process can iterate on its own until the error levels are within target limits. This is unlike typical calibration processes in which a plate with a paint or other light sensitive layer is marked, then removed from the additive manufacturing machine to another station at which the locations of the marks are identified via an optical scanner, to produce an error correction file, which is then fed back into the machine controller and, if it is desired to confirm or improve upon the results, the process is repeated. Instead, embodiments of the present technology include automating this process, without the need for removing and replacing sacrificial plates or other media on which the pattern is marked.

The foregoing process of marking uses a material removal process to calibrate the positioning devices of the apparatus. In particular, the lasers are used to remove photo-sensitive paint from a glass plate, or remove material from a build plate. In other embodiments, the process of marking (used broadly to describe material removal processes) can be used to remove material from the manufactured product as a way of improving the surface finish of the product. For example, one of the multiple lasers described above can include a laser particularly configured to remove material. Such a laser can include a pulsed laser or other laser that operates at a shorter wavelength then is used for sintering/melting so as to produce a high energy density in a short time, sufficient to vaporize and remove material rather than just melt it. In a particular embodiment, if multiple lasers are used to melt and preheat or post-heat the meltpool, an additional laser can be used to vaporize a portion of the material to produce a better surface finish. This process can be conducted on the same pass as the melting and sintering process, or on a separate pass. The process can be conducted using the same laser head as is used to melt the additive material, or in some embodiments, a separate head (e.g., as described above with reference to FIG. 4C) can be used to conduct this process.

An advantage of using a single head to conduct the material removal process is that it can be more efficient than using multiple heads. Conversely, an advantage of using a separate head for the removal process is that it allows or can allow more flexibility because the material removal process is not tied as closely to the material melting process. In any of these embodiments, an advantage of the foregoing technique is that it can improve the overall finish of the product without the need for a separate type of process, e.g., mechanical removal via a CNC machine.

From the foregoing, it will be appreciated that some embodiments of the disclosed technology have been described herein for purposes of illustration, but that various modifications may be made without deviating from the technology. For example, any of the elements described individually under Headings 1-7 above may be combined with any other elements described under these Headings. For example, a laser head having multiple laser directors can be combined with a nozzle configured to remove soot during the additive manufacturing process, and either of the foregoing systems can be combined, alone or together, with embodiments of the additive control system. This representative example is, without limitation, indicative of the types of combinations that the present disclosure enables.

In some embodiments, each laser director includes a separate set of the elements described above with reference to FIG. 2A. In some embodiments, certain of the elements may be shared among individual laser directors. For example, the laser directors can share a common power supply. In some embodiments, individual laser directors can share a common beam generator, with beam splitting techniques used to generate the individual beams, and with further optics used to control the size (e.g., diameter) of each individual beam. Multiple laser directors can be carried in a single head (e.g., as shown in FIG. 2B) or in multiple heads, or in structures other than the head. For example, in some embodiments, the head can be eliminated, and the director(s) can be carried by the chamber or otherwise supported. In such embodiments, the directors can be fixed or movable relative to the chamber, and in some embodiments, the support element (rather than directors) can move relative to the chamber.

In some embodiments, each of the multiple laser beams is moved across the additive material bed at the same rate, with one beam following the other along the beam path 142 described above with reference to FIG. 3. Accordingly, each beam spot spends the same amount of time at any location across the powder bed as does any other beam spot. In other embodiments, one or more of the beams can be scanned at a different rate than one or more other beams. For example, one beam can be scanned more quickly than the others, and can wait at a designated position for the other beams to "catch up" before proceeding. In this way, different beams can provide beam spots with different residence times at the material additive layer 181, which can provide another parameter for controlling the rate at which the corresponding additive material is heated and/or cooled.

In some embodiments, the soot removal configuration described above with reference to FIGS. 4A, 4B can have an annular construction. In some embodiments, the purge system can have other nozzle arrangements that also locally remove soot so as to limit the likelihood for the soot to contaminate other portions of the pre-processed additive material, and/or the post-processed additive material. The gas used to purge the chamber can include argon, in certain examples described above, or it can include other suitable gasses, which are generally inert, and/or which can perform other functions. The recirculating gas system shown in FIG. 6 includes specific elements for purposes of illustration, any one or more of which can be removed and/or replaced with other elements.

The additive material control system described above with reference to FIGS. 8A and 9C can have arrangements other than those specifically shown in the foregoing figures. For example, the blade material can include materials other than rubber. The automated processing system described above with reference to FIGS. 10-14B can also have arrangements other than those expressly shown in the Figures. For example, aspects of the processing system can be fully automated or partially automated. More specifically, a human controller may interface with the apparatus to program specific functions and/or position containers, in particular embodiments. In some embodiments, the entire process can be fully automated. Mechanisms other than those specifically shown in the Figures can be used to control the motion of the laser head and/or build platform.

Certain aspects of the technology described in the context of some embodiments may be combined or eliminated in other embodiments, as discussed above. Further, while advantages associated with some embodiments of the disclosed technology have been described in the context of those embodiments, the technology may also exhibit such advantages in accordance with other embodiments, and not all embodiments need necessarily exhibit such advantages to fall within the scope of the present technology. Accordingly, the present disclosure and associated technology can encompass embodiments not expressly shown or described herein.

As used herein, the term "and/or" when used in the phrase "A and/or B" means "A, or B, or both A and B." A similar manner of interpretation applies to the term "and/or" when used in a list of more than two terms. To the extent any materials incorporated herein by reference conflict with the present disclosure, the present disclosure controls.

We claim:

1. An additive manufacture system, comprising:
a build chamber; and
a head movable relative to the build chamber, and configured to carry energy beam directors, including:
a first energy beam director positioned to direct a first energy beam toward a support element, the support element configured to support an additive build platform; and
a second energy beam director positioned to direct a second energy beam toward the support element, wherein the first energy beam director is configured to pre-heat and/or post-heat additive material positioned beneath the head, and wherein the second energy beam director is positioned to melt the additive material positioned beneath the head.

2. The additive manufacture system of claim 1, further comprising the support element.

3. The additive manufacture system of claim 2 wherein the support element is carried by the build chamber.

4. The additive manufacture system of claim 2 wherein the support element is carried by a build container removably coupled to the build chamber.

5. The additive manufacture system of claim 2 wherein the support element includes a magnetic retention element positioned to releasably support an additive build platform via magnetic force.

6. The additive manufacture system of claim 1 wherein:
the head is configured to deliver the first energy beam via the first energy beam director with a first spot size;
the head is configured to deliver the second energy beam via the second energy beam director with a second spot size; and
the first spot size is different than the second spot size.

7. The additive manufacture system of claim 1 wherein:
the head is configured to deliver the first energy beam via the first energy beam director at a first energy density;
the head is configured to deliver the second energy beam via the second energy beam director at a second energy density; and
the first energy density is different than the second energy density.

8. The additive manufacture system of claim 1, further comprising at least one actuator operatively coupled to the head to move the head relative to the support element, and wherein the first and second energy beam directors each have a fixed position relative to the other.

9. The additive manufacture system of claim 1 wherein the first energy beam director is positioned to pre-heat the additive material, and wherein the additive manufacture system further comprises a third energy beam director carried by the head, the third director being positioned to direct a third energy beam toward the support element to post-heat the additive material.

10. The additive manufacture system of claim 1 wherein the chamber includes chamber walls enclosing a volume having a horizontal cross-sectional area of at least 1296 square inches.

11. The additive manufacture system of claim 1 wherein the head is a first head, and wherein the additive manufacture system further comprises a second head configured to carry a third energy beam director having a higher energy output than the first energy beam director and the second energy beam director.

* * * * *